United States Patent
Wu et al.

(10) Patent No.: US 12,342,319 B2
(45) Date of Patent: Jun. 24, 2025

(54) PAGING METHOD AND APPARATUS

(71) Applicant: HUAWEI TECHNOLOGIES CO., LTD., Guangdong (CN)

(72) Inventors: Yedan Wu, Shanghai (CN); Tingting Geng, Shanghai (CN); Lili Zheng, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 463 days.

(21) Appl. No.: 17/706,061

(22) Filed: Mar. 28, 2022

(65) Prior Publication Data
US 2022/0295444 A1 Sep. 15, 2022

Related U.S. Application Data

(63) Continuation of application No. PCT/CN2019/109097, filed on Sep. 29, 2019.

(51) Int. Cl.
*H04W 68/00* (2009.01)
*H04L 5/00* (2006.01)
*H04W 60/04* (2009.01)
*H04W 76/20* (2018.01)

(52) U.S. Cl.
CPC ......... *H04W 68/005* (2013.01); *H04L 5/0053* (2013.01); *H04W 60/04* (2013.01); *H04W 76/20* (2018.02)

(58) Field of Classification Search
None
See application file for complete search history.

(56) References Cited

U.S. PATENT DOCUMENTS

| | | | |
|---|---|---|---|
| 2019/0082481 A1 | 3/2019 | Ravishankar et al. | |
| 2019/0191409 A1* | 6/2019 | Stojanovski | H04W 72/23 |
| 2021/0176598 A1* | 6/2021 | Zhao | H04W 60/00 |

FOREIGN PATENT DOCUMENTS

| | | |
|---|---|---|
| CN | 101262272 A | 9/2008 |
| CN | 109076491 A | 12/2018 |
| WO | 0110060 A1 | 2/2001 |

OTHER PUBLICATIONS

3GPP TSG-RAN WG2 #106 Tdoc R2-1907159,Further detail on Earth fixed tracking area for LEO NTN,Ericsson,Reno, Nevada, US, May 13-17, 2019,total 5 pages.
(Continued)

*Primary Examiner* — Gary Lafontant
(74) *Attorney, Agent, or Firm* — WOMBLE BOND DICKINSON (US) LLP

(57) ABSTRACT

This application provides a paging method and apparatus. The method includes: A first device receives a first paging message, where the first paging message includes a first list, and the first list includes an area identifier of at least one cell. The first device determines a first cell, where an area identifier of the first cell at a first moment is different from an area identifier of the first cell at a second moment, the first moment is a current moment, and the second moment is earlier than the first moment. When the area identifier of the first cell at the first moment does not belong to the first list, the first device stops paging a terminal device in the first cell. According to the foregoing technical solutions, the first device may effectively page the terminal device, to reduce signaling overheads of the first device, and save power.

8 Claims, 7 Drawing Sheets

(56) References Cited

OTHER PUBLICATIONS

3GPP TSG-RAN WG2 #105bis, Tdoc R2-1905302, Tracking area management and update for NTN LEO,Ericsson, ZTE, Thales,Xian, China, Apr. 8-12, 2019, total 7 pages.

3GPP TR 38.821 V0.5.0:"3rd Generation Partnership Project;Technical Specification Group Radio Access Network; Solutions for NR to support non-terrestrial networks (NTN) (Release 16)",Apr. 2019,total 58 pages.

Fraunhofer IIS, Fraunhofer HHI, NR-NTN: Tracking Area Management. 3GPP TSG-RAN WG3 Meeting #103, Athens, Greece, Feb. 25-Mar. 1, 2019, R3-190178, 15 pages.

Nokia, Nokia Shanghai Bell, Architectural key issues to be considered for NTN . 3GPP TSG-RAN WG3#101, Gothenburg, Sweden, Aug. 20-24, 2018, R3-184898, 3 pages.

3GPP TR 38.821 V0.7.0:"3rd Generation Partnership Project; Technical Specification Group Radio Access Network; Solutions for NR to support non-terrestrial networks (NTN) (Release 16)",3GPP Draft; R3-193293,Jun. 13, 2019, XP051751407, total 86 pages.

Zte et al.: "Tracking Area Management and Paging Handling in NTN", 3GPP Draft; R3-190139,Feb. 16, 2019, pp. 1-13, XP051604086.

\* cited by examiner

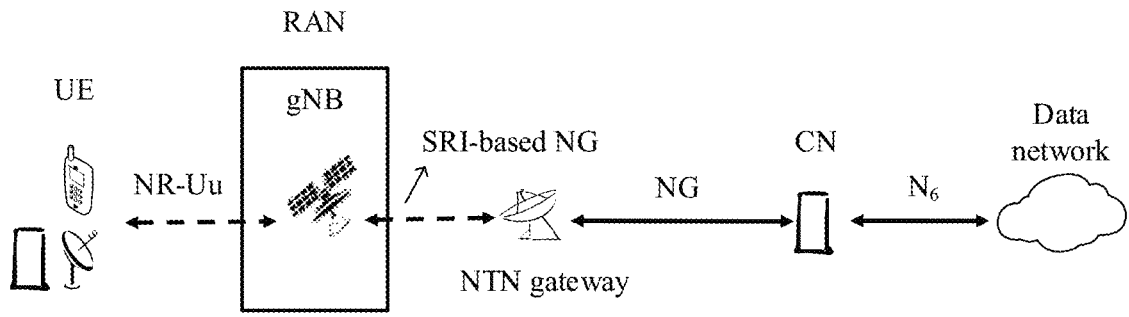

FIG. 5

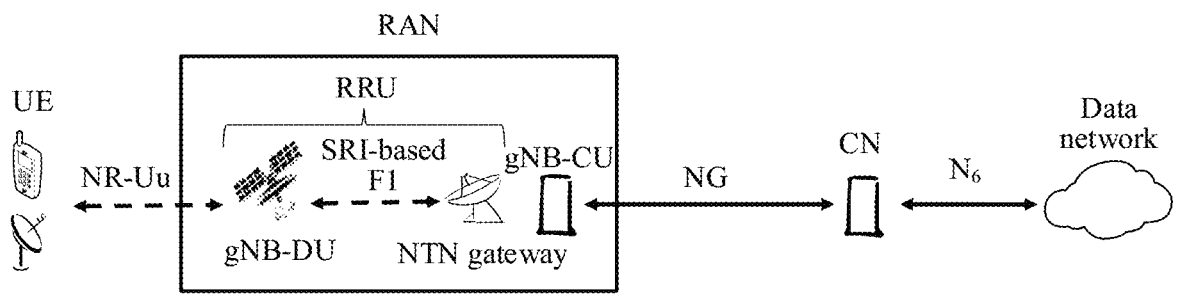

| A first device obtains a first paging message, where the first paging message includes a first list, and the first list includes an area identifier of at least one cell | — 210 |

| The first device determines a first cell, where an area identifier of the first cell at a first moment is different from an area identifier of the first cell at a second moment, the first moment is a current moment, and the second moment is earlier than the first moment | — 220 |

| When the area identifier of the first cell at the first moment does not belong to the first list, the first device forbids paging of a terminal device in the first cell | — 230 |

FIG. 7

PAGING METHOD AND APPARATUS

CROSS-REFERENCE TO RELATED APPLICATIONS

This application is a continuation of International Application No. PCT/CN2019/109097, filed on Sep. 29, 2019, the disclosure of which is hereby incorporated by reference in its entirety.

TECHNICAL FIELD

This application relates to the field of wireless communication technologies, and in particular, to a paging method and apparatus.

BACKGROUND

A conventional terrestrial network cannot provide seamless coverage for a user equipment (UE), especially in places in which a base station cannot be deployed, such as seas, deserts, and the air. Therefore, a non-terrestrial network (NTN) is introduced to a 5G (5th-generation) system. In the NTN, a base station or a part of base station functions is/are deployed on a high-altitude platform or a satellite to provide seamless coverage for a UE, and the high-altitude platform or the satellite is little affected by natural disasters. This can improve reliability of the 5G system.

In NTN communication, when the base station is deployed on a low earth orbit (LEO) satellite, because the LEO satellite continuously moves relative to the ground, a signal coverage area of the LEO satellite on the ground continuously changes, and a UE that the network expects to page may not be within the signal coverage area of the LEO satellite on the ground. Consequently, in the NTN, paging by the LEO satellite is meaningless and air interface resources are wasted.

SUMMARY

This application provides a paging method and apparatus, to reduce signaling overheads of an access network device.

According to a first aspect, a paging method is provided. The method includes: A first device receives a first paging message, where the first paging message includes a first list, and the first list includes an area identifier of at least one cell. The first device determines a first cell, where an area identifier of the first cell at a first moment is different from an area identifier of the first cell at a second moment, the first moment is a current moment, and the second moment is earlier than the first moment. When the area identifier of the first cell at the first moment does not belong to the first list, the first device stops paging a terminal device in the first cell.

In one embodiment, the first cell is a cell covered by the first device. The cell covered by the first device may be understood as: The first device can provide a communication service for a terminal device in the cell covered by the first device.

That an area identifier of the first cell at a first moment is different from an area identifier of the first cell at a second moment may be understood as: The area identifier of the first cell changes within a first time period.

In this technical solution of this application, the first device determines the first cell, and determines, when the area identifier of the first cell changes, whether the first cell belongs to the first list included in the first paging message. When the area identifier of the first cell does not belong to the first list, the first device stops paging the terminal device in the first cell. This can reduce signaling overheads of the first device.

With reference to the first aspect, in some embodiments of the first aspect, the first list is a tracking area identity (TAI) list, and the area identifier of the first cell is a tracking area code (TAC). Alternatively, the first list is a list including an access network area (RNA) and/or a cell global identifier, and the area identifier of the first cell is an access network area code (RANAC) and/or a cell global identifier.

When the first list is the TAI list, the first device receives the first paging message sent by a first core network device. In this case, the to-be-paged terminal device is in an RRC idle state and a CM idle state, and the core network device knows a tracking area (TA) in which the to-be-paged terminal device may be located. Therefore, paging of the terminal device is initiated by the core network device. This paging mode is paging initiated by a core network, namely, CN paging.

When the first list is the list including the RNA and/or the cell global identifier, the first device receives the first paging message sent by a fourth device. In this case, the terminal device is in an RRC third state and a CM_CONNECTED state. The fourth device is an access network device that last serves the to-be-paged terminal device before the to-be-paged terminal device enters the RRC third state from an RRC connected state, and the access network device that last serves the to-be-paged terminal device before the to-be-paged terminal device enters the RRC third state from the RRC connected state knows an RNA and/or the cell in which the to-be-paged terminal device may be located. Therefore, paging of the terminal device is initiated by the access network device that last serves the terminal device before the terminal device enters the RRC third state from the RRC connected state. This paging mode is paging initiated on a base station side, namely, RAN paging.

The first paging message may further include an identity of the terminal device, and the identity of the terminal device is the to-be-paged terminal device.

The first device may determine, based on the first list in the first paging message, the TA in which the to-be-paged terminal device may be located, and may determine the to-be-paged terminal device by using the identity of the terminal device in the first paging message, to initiate the paging to the terminal device in a corresponding coverage area of an access network device.

With reference to the first aspect, in some embodiments of the first aspect, the method further includes: When the area identifier of the first cell at the first moment belongs to the first list, the first device pages the terminal device in the first cell.

When the area identifier of the first cell at the first moment belongs to the first list, the first device pages the terminal device in the first cell, so that the first device can effectively page the to-be-paged terminal device, to reduce the signaling overheads of the first device, and save power of the first device.

With reference to the first aspect, in some embodiments of the first aspect, the first device includes a centralized unit (CU), and that the first device determines a first cell includes: The first device receives a first configuration update message sent by a second device, where the first configuration update message is used to indicate the identifier of the first cell at the first moment, and the second device includes a distributed unit (DU). The first device determines the first cell based on the first configuration update message.

In one embodiment, the first configuration update message may be a DU configuration update message.

In one embodiment, the first cell is a cell covered by the second device. The cell covered by the second device may be understood as: The second device can provide a communication service for a terminal device in the cell covered by the second device.

The first device including the CU receives the first configuration update message sent by the second device including the DU, so that the first device may determine that the area identifier of the first cell changes. In this way, the first device determines whether to page the terminal device in the first cell through the first cell.

With reference to the first aspect, in some embodiments of the first aspect, when the identifier of the first cell at the first moment does not belong to the first list, that the first device stops paging a terminal device in the first cell includes:

When the identifier of the first cell at the first moment does not belong to the first list, the first device sends first information to the second device, where the first information is used to indicate the second device to stop paging the terminal device in the first cell.

In this technical solution of this application, when the area identifier of the first cell does not belong to the first list, the first device stops paging the terminal device in the first cell, to reduce the signaling overheads of the first device, and save the power of the first device.

With reference to the first aspect, in some embodiments of the first aspect, the first device includes a distributed unit (DU), and that a first device receives a first paging message includes: The first device receives the first paging message sent by a third device, where the third device includes a (CU).

When the first list is the TAI list, the first paging message sent by the third device and received by the first device is sent by the first core network device. In this case, the to-be-paged terminal device is in the RRC idle state and the CM idle state, and the core network device knows the tracking area (TA) in which the to-be-paged terminal device may be located. Therefore, the paging of the terminal device is initiated by the core network device. This paging mode is the paging initiated by the core network (the CN paging).

When the first list is the list including the RNA and/or the cell global identifier, the first paging message sent by the third device and received by the first device is sent by the fourth device. In this case, the terminal device is in the RRC third state and the CM_CONNECTED state. The fourth device is the access network device that last serves the to-be-paged terminal device before the to-be-paged terminal device enters the RRC third state from the RRC connected state, and the access network device that last serves the to-be-paged terminal device before the to-be-paged terminal device enters the RRC third state from the RRC connected state knows the RNA and/or the cell in which the to-be-paged terminal device may be located. Therefore, the paging of the terminal device is initiated by the access network device that last serves the terminal device before the terminal device enters the RRC third state from the RRC connected state. This paging mode is the paging initiated on the base station side (the RAN paging).

With reference to the first aspect, in some embodiments of the first aspect, the first information is carried in radio resource control (RRC) signaling, or the first information is carried in a first configuration update acknowledgment (ACK) message.

According to a second aspect, a paging method is provided. The method includes: A second device determines a first cell, where an identifier of the first cell at a first moment is different from an identifier of the first cell at a second moment, the first moment is a current moment, and the second moment is earlier than the first moment. The second device sends a first configuration update message to a first device, where the first configuration update message is used to indicate the identifier that is of the first cell covered by the second device and that is at the first moment, so that the first device determines, based on the first configuration update message, whether to page a terminal device in the first cell.

The second device sends the first configuration update message to the first device, where the first configuration update message is used to indicate the identifier of the first cell at the first moment, and the area identifier of the first cell changes within a first time period, so that the first device determines, based on the first configuration update message, whether to page the terminal device in the first cell. This can reduce signaling overheads of the first device, and save power of the first device.

With reference to the second aspect, in some embodiments of the second aspect, the method further includes: The second device receives first information sent by the first device, where the first information is used to indicate the second device to stop paging the terminal device in the first cell.

With reference to the second aspect, in some embodiments of the second aspect, the first information is carried in radio resource control (RRC) signaling, or the first information is carried in a first configuration update acknowledgment (ACK) message.

The first information is carried in the RRC signaling or the first configuration update acknowledgment ACK message, so that the signaling overheads can be reduced.

According to a third aspect, a paging method is provided. The method includes: A third device sends a first paging message to a first device, where the first paging message includes a first list, and the first list includes an area identifier of a to-be-paged terminal device.

The third device sends the first paging message to the first device, so that the first device determines whether to page the to-be-paged terminal device, to reduce signaling overheads of the first device, and save power of the first device.

With reference to the third aspect, in some embodiments of the third aspect, the first list is a tracking area identity (TAI) list of the to-be-paged terminal device, and an identifier of a first cell is a tracking area code (TAC). Alternatively, the first list is a list including an access network area (RNA) and/or a cell global identifier, and an identifier of a first cell is an access network area code (RANAC) and/or a cell global identifier.

According to a fourth aspect, a paging apparatus is provided. The apparatus includes: a receiving unit, configured to receive a first paging message, where the first paging message includes a first list, and the first list includes an area identifier of at least one cell; a determining unit, configured to determine a first cell, where an area identifier of the first cell at a first moment is different from an area identifier of the first cell at a second moment, the first moment is a current moment, and the second moment is earlier than the first moment; and a paging unit, configured to: when the area identifier of the first cell at the first moment does not belong to the first list, stop paging a terminal device in the first cell.

In one embodiment, the first cell is a cell covered by the paging apparatus. The cell covered by the paging apparatus means: The paging apparatus can provide a communication service for a terminal device in the cell covered by the paging apparatus.

With reference to the fourth aspect, in some embodiments of the fourth aspect, the first list is a tracking area identity (TAI) list, and the area identifier of the first cell is a tracking area code (TAC). Alternatively, the first list is a list including an access network area (RNA) and/or a cell global identifier, and the area identifier of the first cell is an access network area code (RANAC) and/or a cell global identifier.

With reference to the fourth aspect, in some embodiments of the fourth aspect, the paging unit is further configured to: when the area identifier of the first cell at the first moment belongs to the first list, page the terminal device in the first cell.

According to a fifth aspect, a paging apparatus is provided. The apparatus includes a centralized unit (CU), configured to receive a first paging message, where the first paging message includes a first list, and the first list includes an area identifier of at least one cell. The CU is further configured to receive a first configuration update message sent by a second apparatus, where the first configuration update message is used to indicate an area identifier of a first cell at a first moment, and the second apparatus includes a distributed unit (DU). The CU is further configured to determine the first cell based on the first configuration update message. When the area identifier of the first cell at the first moment does not belong to the first list, the CU is further configured to send first information to the second apparatus, where the first information is used to indicate the second apparatus to stop paging a terminal device in the first cell.

With reference to the fifth aspect, in some embodiments of the fifth aspect, the first list is a tracking area identity (TAI) list, and the area identifier of the first cell is a tracking area code (TAC). Alternatively, the first list is a list including an access network area (RNA) and/or a cell global identifier, and the area identifier of the first cell is an access network area code (RANAC) and/or a cell global identifier.

With reference to the fifth aspect, in some embodiments of the fifth aspect, the first information is carried in radio resource control (RRC) signaling, or the first information is carried in a first configuration update acknowledgment (ACK) message.

According to a sixth aspect, a paging apparatus is provided. The apparatus includes a distributed unit (DU), configured to determine a first cell, where an area identifier of the first cell at a first moment is different from an area identifier of the first cell at a second moment, the first moment is a current moment, and the second moment is earlier than the first moment. The DU is further configured to send a first configuration update message to a first apparatus, where the first configuration update message is used to indicate the area identifier of the first cell at the first moment, and the first apparatus includes a centralized unit (CU). The DU is further configured to receive first information sent by the first apparatus, where the first information is used to indicate the DU to stop paging a terminal device in the first cell.

With reference to the sixth aspect, in some embodiments of the sixth aspect, the first information is carried in radio resource control (RRC) signaling, or the first information is carried in a first configuration update acknowledgment (ACK) message.

According to a seventh aspect, a paging apparatus is provided. The apparatus includes a distributed unit (DU) and a centralized unit (CU). The CU is configured to receive a first paging message, where the first paging message includes a first list, and the first list includes an area identifier of at least one cell. The DU is configured to determine a first cell, where an area identifier of the first cell at a first moment is different from an area identifier of the first cell at a second moment, the first moment is a current moment, and the second moment is earlier than the first moment. The CU is configured to receive a first configuration update message sent by the DU, where the first configuration update message is used to indicate the area identifier of the first cell at the first moment. The CU is further configured to determine the first cell based on the first configuration update message. When the area identifier of the first cell at the first moment does not belong to the first list, the CU is further configured to send first information to the DU, where the first information is used to indicate the DU to stop paging a terminal device in the first cell.

In one embodiment, the first cell is a cell covered by the DU. The cell covered by the DU may be understood as: The DU can provide a communication service for a terminal device in the cell covered by the DU.

The paging apparatus provided in this embodiment of this application includes the DU and the CU. The CU receives the first paging message. The DU determines the first cell, and sends, to the CU, the first configuration update message that carries the area identifier of the first cell at the first moment. In this way, the CU may send the first information to the DU based on the first configuration update message when the area identifier of the first cell at the first moment does not belong to the first list carried in the first paging message, and the DU stops, based on the first message, paging the terminal device in the first cell, so that the paging apparatus can effectively page the to-be-paged terminal device, to reduce signaling overheads of the paging apparatus, and save power of the paging apparatus.

With reference to the seventh aspect, in some embodiments of the seventh aspect, the first list is a tracking area identity (TAI) list, and the area identifier of the first cell is a tracking area code (TAC). Alternatively, the first list is a list including an access network area (RNA) and/or a cell global identifier, and the area identifier of the first cell is an access network area code (RANAC) and/or a cell global identifier.

When the first list is the TAI list, the CU receives the first paging message sent by a first core network device. In this case, the to-be-paged terminal device is in an RRC idle state and a CM idle state, and the core network device knows a tracking area TA in which the to-be-paged terminal device may be located. Therefore, paging of the terminal device is initiated by the core network device. This paging mode is paging initiated by a core network (CN paging).

When the first list is the list including the RNA and/or the cell global identifier, the CU receives the first paging message sent by a fourth device. In this case, the terminal device is in an RRC third state and a CM_CONNECTED state. The fourth device is an access network device that last serves the to-be-paged terminal device before the to-be-paged terminal device enters the RRC third state from an RRC connected state, and the access network device that last serves the to-be-paged terminal device before the to-be-paged terminal device enters the RRC third state from the RRC connected state knows an RNA and/or the cell in which the to-be-paged terminal device may be located. Therefore, paging of the terminal device is initiated by the access network device that last serves the terminal device before the terminal device enters the RRC third state from the RRC connected state. This paging mode is paging initiated on a base station side (RAN paging).

With reference to the seventh aspect, in some embodiments of the seventh aspect, the first information is carried in radio resource control (RRC) signaling, or the first information is carried in a first configuration update acknowledgment (ACK) message.

According to an eighth aspect, a paging apparatus is provided. The apparatus includes a centralized unit (CU), configured to receive a first paging message, where the first paging message includes a first list, and the first list includes an area identifier of at least one cell. The CU is configured to send the first paging message to a second apparatus, where the second apparatus includes a distributed unit (DU).

With reference to the eighth aspect, in some embodiments of the eighth aspect, the first list is a tracking area identity (TAI) list, and an area identifier of a first cell is a tracking area code (TAC). Alternatively, the first list is a list including an access network area (RNA) and/or a cell global identifier, and an area identifier of a first cell is an access network area code (RANAC) and/or a cell global identifier.

According to a ninth aspect, a paging apparatus is provided. The apparatus includes a distributed unit (DU), configured to receive a first paging message sent by a first apparatus, where the first paging message includes a first list, the first list includes an area identifier of at least one cell, and the first apparatus includes a centralized unit (CU). The DU is further configured to determine a first cell, where an area identifier of the first cell at a first moment is different from an area identifier of the first cell at a second moment, the first moment is a current moment, and the second moment is earlier than the first moment. When the area identifier of the first cell at the first moment does not belong to the first list, the DU is further configured to stop paging a terminal device in the first cell.

With reference to the ninth aspect, in some embodiments of the ninth aspect, the first list is a tracking area identity (TAI) list, and the area identifier of the first cell is a tracking area code (TAC). Alternatively, the first list is a list including an access network area (RNA) and/or a cell global identifier, and the area identifier of the first cell is an access network area code (RANAC) and/or a cell global identifier.

With reference to the ninth aspect, in some embodiments of the ninth aspect, the DU is further configured to: when the area identifier of the first cell at the first moment belongs to the first list, page the terminal device in the first cell.

According to a tenth aspect, a paging apparatus is provided. The apparatus includes a distributed unit (DU) and a centralized unit (CU). The CU is configured to receive a first paging message, where the first paging message includes a first list, and the first list includes an area identifier of at least one cell. The DU is configured to receive the first paging message sent by the CU. The DU is further configured to determine a first cell, where an area identifier of the first cell at a first moment is different from an area identifier of the first cell at a second moment, the first moment is a current moment, and the second moment is earlier than the first moment. When the area identifier of the first cell at the first moment does not belong to the first list, the DU is further configured to stop paging a terminal device in the first cell.

With reference to the tenth aspect, in some embodiments of the tenth aspect, the first list is a tracking area identity (TAI) list, and the area identifier of the first cell is a tracking area code (TAC). Alternatively, the first list is a list including an access network area (RNA) and/or a cell global identifier, and the area identifier of the first cell is an access network area code (RANAC) and/or a cell global identifier.

With reference to the tenth aspect, in some embodiments of the tenth aspect, the DU is further configured to: when the area identifier of the first cell at the first moment belongs to the first list, page the terminal device in the first cell.

According to an eleventh aspect, this application provides an access network device, including a processor and a memory. The memory is configured to store a computer program, and the processor is configured to invoke and run the computer program stored in the memory, to enable the access network device to perform the method according to any one of the first aspect or the possible embodiments of the first aspect.

The access network device in the eleventh aspect may be an access network device.

According to a twelfth aspect, this application provides a computer-readable storage medium. The computer-readable storage medium stores computer instructions. When the computer instructions are run on a computer, the computer is enabled to perform the method according to any one of the first aspect or the possible embodiments of the first aspect.

According to a thirteenth aspect, this application provides a chip, including a processor. The processor is configured to read and execute a computer program stored in a memory, to perform the method according to any one of the first aspect or the possible embodiments of the first aspect.

In one embodiment, the chip further includes the memory, and the processor is connected to the memory through a circuit or a wire.

Further, in one embodiment, the chip further includes a communication interface.

According to a fourteenth aspect, this application provides a computer program product. The computer program product includes computer program code. When the computer program code is run on a computer, the computer is enabled to perform the method according to any one of the first aspect or the possible embodiments of the first aspect.

BRIEF DESCRIPTION OF DRAWINGS

FIG. 5 is a schematic diagram of an architecture of a communication system used in an embodiment of this application;

FIG. 6 is a schematic diagram of another architecture of a communication system used in an embodiment of this application;

FIG. 7 is a schematic flowchart of a paging method 200 according to an embodiment of this application;

DESCRIPTION OF EMBODIMENTS

The following describes technical solutions in this application with reference to accompanying drawings.

The technical solutions in embodiments of this application may be applied to various communication systems, such as a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (time TDD) system, a universal mobile telecommunications system (UMTS), a worldwide interoperability for microwave access (WiMAX) communication system, and a future 5th generation (5G) system or new radio (NR) system.

Figure 1:
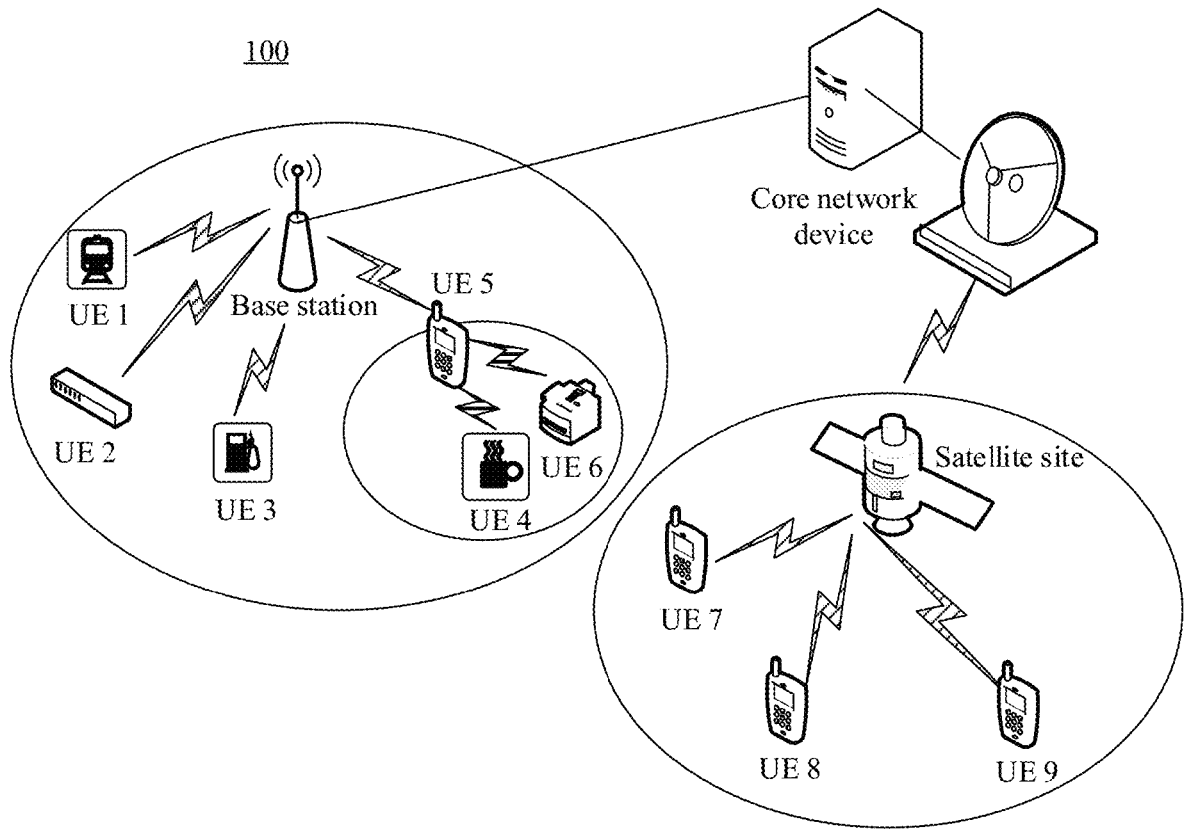
FIG. 1 is a schematic diagram of a communication system used in embodiments of this application.

To facilitate understanding of embodiments of this application, a communication system used in a method according to embodiments of this application is first described in detail with reference to FIG. 1. FIG. 1 is a schematic diagram of a communication system 100 used in the method according to embodiments of this application. As shown in FIG. 1, the communication system 100 may include at least one access network device, for example, a gNB and a satellite site in a 5G system shown in FIG. 1. The communication system 100 may further include at least one terminal device, for example, a user equipment (UE) 1 to a UE 9 shown in FIG. 1. The access network device may communicate with each terminal device over a radio link. For example, the access network device may send configuration information to the terminal device, and the terminal device may send uplink data to the access network device based on the configuration information. For another example, the access network device may send downlink data to the terminal device. Therefore, a communication system may include the gNB and the UE 1 to the UE 6 in FIG. 1, and another communication system may include the satellite site and the UE 7 to the UE 9 in FIG. 1. In addition, the base station and the satellite site are connected to a core network device in different manners, and both may send data to or receive data from the core network device. In this architecture, there may be a plurality of satellite sites or a plurality of base stations, and the satellite site may also serve UE similar to the UE 1 to the UE 6. This is not limited in this application. A plurality of antennas may be configured for each communication device, for example, the base station, the satellite site, or the UE 1 to the UE 9. The plurality of antennas may include at least one transmit antenna configured to send a signal and at least one receive antenna configured to receive a signal. In addition, each communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the base station may communicate with the UE 11 to the UE 6 by using a multiple-antenna technology, and the satellite site may communicate with the UE 7 to the UE 9 by using the multiple-antenna technology.

A communication system may alternatively include the terminal devices in the communication system 100, for example, the UE 4 to the UE 6. For example, the UE 5 may control the UE 4 and the UE 6 to execute corresponding instructions. This is not limited in this application.

It should be further understood that FIG. 1 is merely a simplified schematic diagram used as an example for ease of understanding. The communication system 100 may further include another access network device or terminal device that is not shown in FIG. 1.

It should be understood that the access network device in the wireless communication system may be any device with a wireless transceiver function. The device includes but is not limited to an evolved NodeB (eNB or eNodeB), a radio network controller (RNC), a NodeB (NB), a base station controller (BSC), a base transceiver station (BTS), a home base station (for example, a home evolved NodeB or a home NodeB, HNB), a baseband unit (BBU), an access point (AP) in a wireless fidelity (Wi-Fi) system, a wireless relay node, a wireless backhaul node, a transmission point (TP), a transmission reception point (TRP), and the like. Alternatively, the device may be a gNB or a transmission point (TRP or TP) in a 5G system such as an NR system, may be one antenna panel or a group of antenna panels (including a plurality of antenna panels) of a base station in a 5G system, or may be a network node, such as a baseband unit (BBU) or a distributed unit (DU), that constitutes a gNB or a transmission point.

In some deployments, a gNB may include a centralized unit (CU) and a DU. The gNB may further include a radio unit (RU). The CU implements some functions of the gNB, and the DU implements some functions of the gNB. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling such as RRC layer signaling may also be considered as being sent by the DU or by the DU and the CU. It may be understood that the access network device may be a CU node, a DU node, or a device including a CU node and a DU node. In addition, the CU may be classified as an access network device in an access network (RAN), or may be classified as an access network device in a core network (CN). This is not limited in this application.

It should be further understood that the terminal device in the wireless communication system may also be referred to as a user equipment (UE), an access terminal, a subscriber unit, a subscriber station, a mobile station, a mobile station, a remote station, a remote terminal, a mobile device, a user terminal, a terminal, a wireless communication device, a user agent, or a user apparatus. The terminal device in embodiments of this application may be a mobile phone, a tablet computer (pad), a computer having a wireless transceiver function, a virtual reality (VR) terminal device, an augmented reality (AR) terminal device, a wireless terminal in industrial control, a wireless terminal in self driving, a wireless terminal in telemedicine (remote medical), a wireless terminal in a smart grid, a wireless terminal in transportation safety, a wireless terminal in a smart city, a wireless terminal in a smart home, or the like. An application scenario is not limited in embodiments of this application.

In embodiments of this application, the terminal device or the access network device includes a hardware layer, an operating system layer running on the hardware layer, and an application layer running on the operating system layer. The hardware layer includes hardware such as a central processing unit (CPU), a memory management unit (MMU), and a memory (also referred to as a main memory). The operating system may be any one or more computer operating systems that implement service processing through a process, for example, a Linux operating system, a UNIX operating system, an Android operating system, an iOS operating system, or a Windows operating system. The application layer includes applications such as a browser, a contact list, word processing software, and instant messaging software. In addition, a structure of an execution body of the method provided in embodiments of this application is not limited in embodiments of this application, provided that a program that records code of the method provided in embodiments of this application can be run to perform communication according to the method provided in embodiments of this application. For example, the method provided in embodiments of this application may be performed by the terminal device, the access network device, or a functional module that can invoke and execute the program and that is in the terminal device or the access network device.

In addition, aspects or features of this application may be implemented as a method, an apparatus, or a product that uses standard programming and/or engineering technologies. The term "product" used in this application covers a computer program that can be accessed from any computer-readable component, carrier, or medium. For example, the computer-readable medium may include but is not limited to a magnetic storage component (for example, a hard disk, a floppy disk, or a magnetic tape), an optical disc (for example, a compact disc (CD) or a digital versatile disc (DVD)), a smart card, and a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a radio channel and various other media that can store, include, and/or carry instructions and/or data.

To facilitate understanding of embodiments of this application, related technical content in this application is briefly described first.

1. NTN

The NTN is a communication scenario in a 5G system. A conventional terrestrial network cannot provide seamless coverage for a terminal device, especially in places in which a base station cannot be deployed, such as seas, deserts, and the air. Therefore, the non-terrestrial network is introduced to the 5G system. In the NTN, a base station or a part of base station functions is/are deployed on a high-altitude platform or a satellite, to provide seamless coverage for a terminal device, and the high-altitude platform or the satellite is little affected by natural disasters. This can improve reliability of the 5G system.

In the NTN, the terminal device with a long antenna may be in a communication connection with the base station deployed on the high-altitude platform or the satellite. The high-altitude platform may be a hot air balloon, an airplane, or another flight vehicle. The satellite may be an LEO satellite, a medium earth orbit (MEO) satellite, a geostationary earth orbit (GEO) satellite, or the like.

2. Public Land Mobile Network (PLMN)

The PLMN is a network that is established and operated by a government or an operator authorized by the government, to provide land mobile communication services for the public. The PLMN is generally interconnected with a public switched telephone network (PSTN) to form a regional or national-scale communication network. The PLMN is a wireless communication system mainly for a mobile user on the land, for example, in a vehicle or on foot.

3. Radio Resource Control (RRC) State

Figure 2:
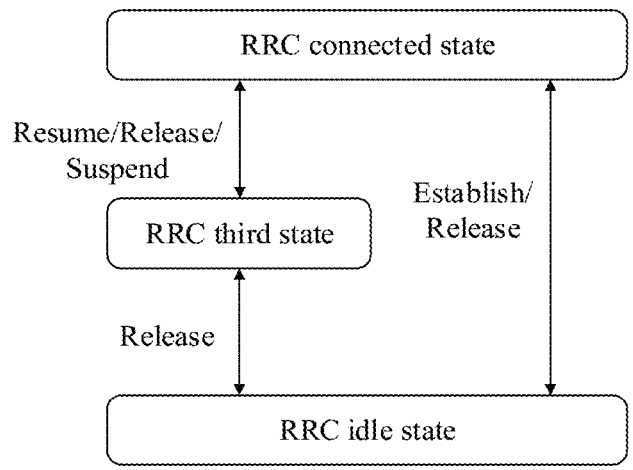
FIG. 2 is a schematic diagram of a transition relationship among three RRC states.

In the 5G system, RRC states of the terminal device include an RRC connected state (RRC_CONNECTED), an RRC inactive state or an RRC third state (RRC_INACTIVE), and an RRC idle state (RRC_IDLE). FIG. 2 is a schematic diagram of a transition relationship among the three RRC states.

When the terminal device is in the RRC connected state, links have been established between the terminal device and both a base station and a core network, and data may be directly transmitted to the terminal device when arriving in the network. When the terminal device is in the RRC third state (or the RRC inactive state), it indicates that the links were established between the terminal device and both the base station and the core network, but the link between the terminal device and the base station is released (that is, the terminal device switches from the RRC connected state to the RRC third state). Although the link is released, the base station stores a context of the terminal device. When data needs to be transmitted, the base station can quickly resume the link between the terminal device and the base station (that is, the terminal device switches from the RRC third state to the RRC connected state). When the terminal device is in the RRC idle state, there is no link between the terminal device and the base station or the core network. When data needs to be transmitted, the links between the terminal device and both the base station and the core network need to be established (that is, the terminal device switches from the RRC idle state to the RRC connected state).

4. Tracking Area (TA)

The tracking area is a concept that is set by an LTE/NR system for location management of the terminal device. The tracking area is defined as a free movement area in which a service does not need to be updated for the terminal device. The TA is used for terminal location management, and the terminal location management may be classified into paging management and location update management. The terminal device notifies the core network of the TA of the terminal device through tracking area registration.

When the terminal device is in the RRC idle state, the core network can know the tracking area of the terminal device. In addition, when the terminal device in the RRC idle state needs to be paged, paging may be performed in all cells in the tracking area registered by the terminal device.

The TA is configured at a cell level. A same TA may be configured for a plurality of cells, and one cell belongs to only one TA.

A tracking area identity (TAI) includes a PLMN and a tracking area code (TAC), in other words, TAI=PLMN+TAC.

Figure 3:
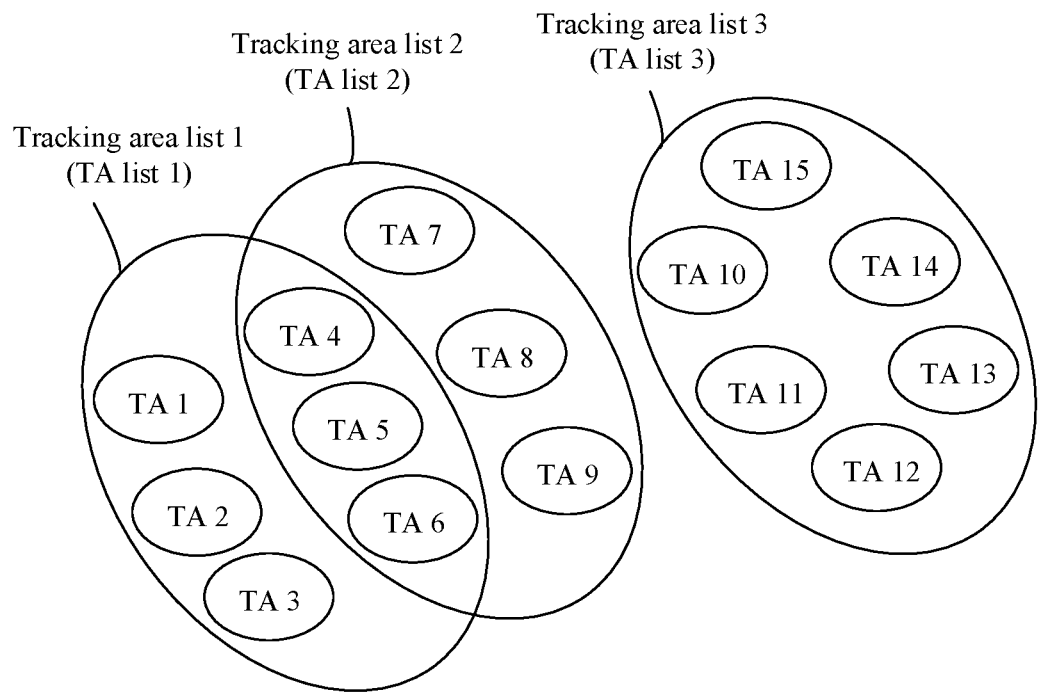
FIG. 3 is a schematic diagram of three TA lists.

A TA list includes a plurality of TAs, and the plurality of TAs are allocated to one UE. When moving within the TA list, the UE does not need to perform TA update (TAU), to reduce frequent interaction with the network. For example, as shown in FIG. 3, a TA list 1 includes a TA 1, a TA 2, a TA 3, a TA 4, a TA 5, and a TA 6; a TA list 2 includes the TA 4, the TA 5, the TA 6, a TA 7, a TA 8, and a TA 9; a TA list 3 includes a TA 10, a TA 11, a TA 12, a TA 13, a TA 14, and a TA 15. The TA list 1 may be allocated to a terminal device 1. When moving in the TA (the TA 1, the TA 2, the TA 3, the TA 4, the TA 5, or the TA 6) or between the TAs in the TA list 1, the terminal device 1 does not need to perform TAU. The TA list 2 may be allocated to a terminal device 2. When moving in the TA (the TA 4, the TA 5, the TA 6, the TA 7, the TA 8, or the TA 9) or between the TAs in the TA list 2, the terminal device 2 does not need to perform TAU. The TA list 3 may be allocated to a terminal device 3. When moving in the TA (the TA 10, the TA 11, the TA 12, the TA 13, the TA 14, or the TA 15) or between the TAs in the TA list 3, the terminal device 3 does not need to perform TAU.

When entering a TA that is not in the TA list registered by the terminal device, the terminal device needs to perform TAU, and the core network reallocates a group of TAs to the terminal device, where the newly allocated TAs may also include some TAs in the original TA list. As shown in FIG. 3, for example, when the terminal device 1 moves to the TA 9, the terminal device 1 enters a TA that is not in the TA list 1 registered by the terminal device 1. In this case, the terminal device 1 needs to perform TAU to add the TA 9 to the TA list 1. For another example, when the terminal device 2 moves to the TA 11, the terminal device 2 enters a TA that is not in the TA list 2 registered by the terminal device 2. In this case, the terminal device 2 needs to perform TAU to add the TA 11 to the TA list 1. In addition, the terminal device further periodically performs TAU to enable the core network to know a location of the terminal device.

5. Access Network Area (RAN-Based Notification Area, RNA)

The concept of RNA is similar to the concept of TA, but the RNA is particular to a terminal device in the RRC third state (or the RRC inactive state). There are two choices for composition of the RNA:

A. List of cells

B. List of access network areas (list of RAN areas), where each RNA includes a part or all of TAs.

A base station that last serves the terminal device before the terminal device enters the RRC third state configures the RNA for the terminal device. When moving within a range of the RNA, the terminal device does not need to perform RNA update (RNAU). The terminal device initiates RNAU if the terminal device enters a TA that is not in the RNA configured for the terminal device by the base station that last serves the terminal device before the terminal device enters the RRC third state. In addition, the terminal device also periodically performs TAU, so that the base station that last serves the terminal device before the terminal device enters the RRC third state knows the location of the terminal device.

6. Paging

When the terminal device is in the RRC idle state, no link is established between the terminal device and the base station. Alternatively, when the terminal device is in the RRC third state, the link established between the terminal device and the base station is released by the base station. In this case, if data or a voice needs to be sent from a network side to the terminal device, the terminal device is found by using a paging message. After receiving the paging message, the terminal device establishes the link to the base station, to transmit the data or the voice.

In one embodiment, paging is classified into two types:

(1) CN-initiated paging (CN Paging): particular to a terminal device in the RRC idle state and a connection management (CM) idle state, where a paging message is based on a TA. The paging is initiated by an access and mobility management function (AMF) in the 5G core network. The AMF sends the paging message to all base stations included in a TAI list of the terminal device, and then these base stations transparently transmit the paging message to all terminal devices connected to cells related to the base stations. A terminal device that detects the paging message checks whether the paging message includes an identity (ID) of the terminal device. If the paging message includes the ID of the terminal device, the terminal device initiates an RRC setup request to the base station, so that the terminal device is connected to the network. If the paging message does not include the ID of the terminal device, the terminal device ignores the paging request.

In a CU-DU architecture, a CU determines cells included in the TAI list in the paging message and DUs to which the cells belong, and then sends, to the related DUs, a list of cells that is related to the paging message, so that the DUs generate paging messages, and send the paging messages to all terminal devices connected to the cells related to the DUs.

(2) RAN side—initiated paging (RAN Paging): particular to a terminal device in the RRC third state and a connection management connected state (Connection Manager CONNECTED, CM_CONNECTED), where a paging message is based on an RNA. The paging is initiated by the base station that last serves the terminal device before the terminal device enters the RRC third state from the RRC connected state. An AMF side cannot perceive that the terminal device enters the RRC third state. Therefore, the AMF considers that the terminal device is still in the RRC connected state, and the AMF continues to send data to the last serving base station. However, a link between the last serving base station and the terminal device has been released, and the last serving base station cannot find the terminal device, but the last serving base station configures the RNA for the terminal device. The last base station sends the paging message to all base stations in a RANAC list of the terminal device, and then the base stations transparently transmit the paging message to all terminal devices connected to cells related to the base stations. A terminal device that detects the paging message checks whether the paging message includes an identity (ID) of the terminal device. If the paging message includes the ID of the terminal device, the terminal device initiates an RRC setup request to the base station, so that the terminal device is connected to the network. If the paging message does not include the ID of the terminal device, the terminal device ignores the paging request.

In a CU-DU architecture, a CU determines cells included in a RAN paging area in the paging message and DUs to which the cells belong, and then sends, to the related DUs, a list of cells that is related to the paging message, so that the DUs generate paging messages, and send the paging messages to all terminal devices connected to the cells related to the DUs.

7. Satellite Communication

A higher orbit of a satellite indicates a larger area of the satellite and a longer communication delay. Generally, orbits of satellites may be classified based on heights into:

(1) LEO: with an orbit height of 160 to 2000 km;

(2) medium earth orbit (MEO): with an orbit height of 2000 to 35786 km; and (3) geostationary earth orbit (GEO): with an orbit height of 35786 km, where a location, relative to the earth, of a satellite revolving in this orbit is not affected by rotation of the earth.

A low earth orbit communication satellite is close to the ground, and has a short communication delay and a high data transmission rate.

A location of an access network device in the conventional terrestrial network is fixed. When an NG interface connection is established between the access network device and a core network device, the access network device sends a TAC or a RANAC supported by the access network device to the core network device. Because the location of the access network device is fixed, planning of a TAC or a RANAC supported by each access network device remains unchanged, and a TAC or a RANAC of each cell within coverage of each access network device remains unchanged.

Figure 4A:
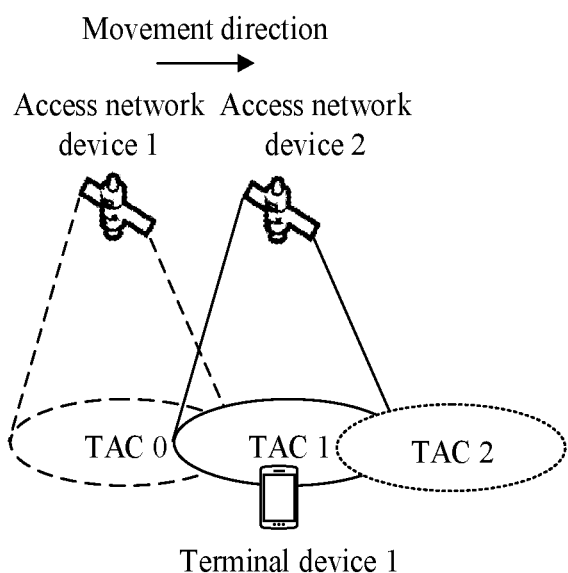
FIG. 4(a) and FIG. 4(b) are a schematic diagram of a TAC covered by a LEO in a LEO movement process.
Figure 4B:
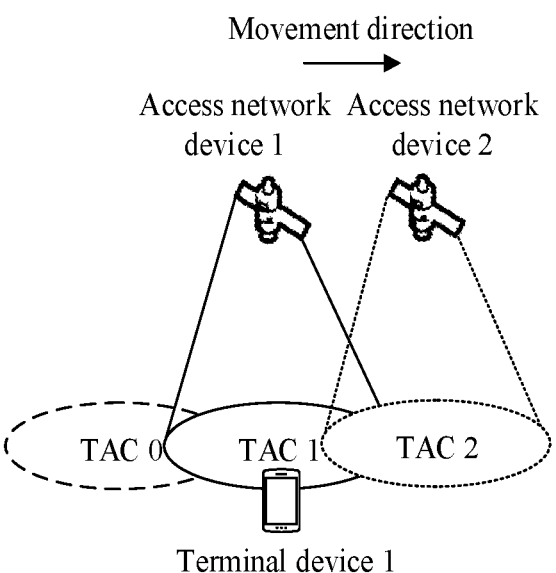

A LEO access network device in the NTN continuously moves relative to the ground. Currently, a geographical location is bound to a TA. That is, when the LEO access network device moves, a TA of the LEO access network device continuously changes, but a TA of the terminal device remains unchanged. For example, FIG. 4(a) and FIG. 4(b) are a schematic diagram of a TAC change of the LEO access network device in a movement process of the LEO access network device. As shown in FIG. 4(a), data transmission needs to be performed between the access network device and a terminal device 1. At a moment $t_0$, a coverage area of a beam sent by an antenna of an access network device 1 is a TAC 0 on the ground, and a coverage area of a beam sent by an antenna of an access network device 2 is a TAC 1 on the ground. In this case, the terminal device 1 is in the TAC 1, and the access network device 2 receives a paging message, and sends the paging message to a terminal device connected to a corresponding cell in a TA list 1 or a RANAC list 1. The TA list 1 or the RANAC list 1 includes a TA 1 corresponding to the TAC 1. However, as the access network device 1 and the access network device 2 move, the coverage areas of the beam sent by the antenna of the access network device 1 and the beam sent by the antenna of the access network device 2 change on the ground. As shown in FIG. 4(b), at a moment $t_1$, a coverage area of the beam sent by the antenna of the access network device 1 is the TAC 1 on the ground, and a coverage area of the beam sent by the antenna of the access network device 2 is a TAC 2 on the ground, where the moment $t_1$ is later than the moment $t_0$. In this case, the access network device 2 sends the paging message to a terminal device connected to a corresponding cell in a TA list 2 or a RANAC list 2, where the TA list 2 or the RANAC list 2 includes a TA 2 corresponding to the TAC 2, and does not include the TA 1 corresponding to the TAC 1. However, the terminal device 1 is still within the TAC 1, and cannot receive the paging message. As a result, the access network device performs ineffective paging.

In an existing protocol, a paging message received by an access network device carries two parameters: (1) Intended quantity of paging attempts (Intended Number of Paging Attempts), namely, expected quantity of paging times: A terminal device does not monitor a paging channel all the time, and a paging message may not be monitored due to various reasons. Therefore, a plurality of times, for example, 10 times, of paging is usually set. (2) Paging attempt count, namely, quantity of paging attempts: In one embodiment, a value of the paging attempt count is increased by one each time the access network device sends a paging message.

The access network device stops paging the terminal device only when either of the following two conditions is met. Condition 1: The paging attempt count is equal to the intended quantity of paging attempts. Condition 2: An RRC state of the terminal device changes. For example, the RRC state of the terminal device changes from the RRC idle state to the RRC connected state. For another example, the RRC state of the terminal device changes from the RRC idle state to another state.

Therefore, as the access network device continuously moves, the terminal device paged by the access network device may not be within a coverage area, on the ground, of a beam sent by an antenna of the access network device. As a result, the terminal device cannot receive the paging message of the access network device, and consequently the access network device performs ineffective paging. In addition, the access network device stops paging the terminal device only when either of the foregoing two conditions is met. This increases signaling overheads of the access network device and causes a waste of power of the access network device.

Therefore, this application provides a paging method, to reduce the signaling overheads of the access network device, and save the power of the access network device.

To facilitate understanding of embodiments of this application, the following description is first provided before embodiments of this application are described.

First, in embodiments of this application, an "indication" may include a direct indication and an indirect indication, or may include an explicit indication and an implicit indication. Information indicated by particular information (for example, the following first information) is referred to as to-be-indicated information. In one embodiment process, the to-be-indicated information may be indicated in a plurality of manners, for example, but not limited to, directly indicating the to-be-indicated information, for example, indicating the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or agreed on in advance. For example, particular information may alternatively be indicated by using an arrangement sequence of all information that is agreed on in advance (for example, stipulated in a protocol), to reduce indication overheads to some extent.

Second, the terms "first", "second", and various numbers in the following embodiments are merely used for differentiation for ease of description, and are not used to limit the scope of embodiments of this application. For example, the terms are used to distinguish between different indication information.

Third, "a plurality of" in embodiments of this application means two or more.

Fourth, "core network device" in embodiments of this application may be an access and mobility management function (AMF), but is not limited to the AMF.

Fifth, "access network device" in embodiments of this application may be a gNB.

The following uses different access network device architectures to separately describe in detail the paging method provided in embodiments of this application.

FIG. 5 is a schematic diagram of an architecture of a communication system used in an embodiment of this application. As shown in FIG. 5, a satellite carries payloads having functions of an entire access network device. A terminal device is connected to the access network device through a wireless $U_U$ interface, and the access network device establishes a wireless feedback link to a CN through a terrestrial NTN gateway.

In new radio (NR), the Uu interface is also referred to as NR-Uu. In addition, an $N_6$ interface shown in FIG. 5 is an interface between the CN and a data network. An NG interface is used between the CN and the NTN gateway. A satellite radio interface (SRI)-based NG interface is used between the NTN gateway and a radio access network (RAN).

FIG. 6 is a schematic diagram of another architecture of a communication system used in an embodiment of this application. As shown in FIG. 6, a satellite carries payloads having a part of functions of an access network device. For example, the satellite may carry a DU, and the DU in the air establishes a wireless feedback link to a CU through a terrestrial NTN gateway.

In addition, in FIG. 6, an SRI-based F1 interface is used between the DU and the CU of the access network device, where RRU represents a radio remote unit.

FIG. 7 is a schematic flowchart of a paging method 200 according to this application. With reference to FIG. 7, the following describes the paging method 200 provided in an embodiment of this application. The method 200 includes process 210 to process 230. A first device in the method 200 may be the satellite in FIG. 5, and the first device carries payloads having functions of an entire access network device.

Process 210: The first device receives a first paging message, where the first paging message includes a first list, and the first list includes an area identifier of at least one cell.

The first paging message may further include an identity of a terminal device, and the identity of the terminal device is a to-be-paged terminal device.

The at least one cell is a cell in which the to-be-paged terminal device may be located. That the at least one cell is a cell in which the to-be-paged terminal device may be located may be understood as: The to-be-paged terminal device is in an area covered by the at least one cell.

The first list is a TAI list, or is a list including an RNA and/or a cell global identifier. When the first list is the TAI list, the first device receives the first paging message sent by a first core network device. In this case, the terminal device is in an RRC idle state and a CM idle state, and the core network device knows a TA in which the to-be-paged terminal device may be located. Therefore, paging of the terminal device is initiated by the core network device. This paging mode is CN paging.

When the first list is the list including the RNA and/or the cell global identifier, the first device receives the first paging message sent by a fourth device. In this case, the terminal device is in an RRC third state and a CM_CONNECTED state. The fourth device is an access network device that last serves the terminal device before the terminal device enters the RRC third state from an RRC connected state, and the access network device that last serves the to-be-paged terminal device before the to-be-paged terminal device enters the RRC third state from the RRC connected state knows an RNA and/or the cell in which the to-be-paged terminal device may be located. Therefore, paging of the terminal device is initiated by the access network device that last serves the terminal device before the terminal device enters the RRC third state from the RRC connected state. This paging mode is RAN paging.

In one embodiment, there may be one or more first devices, and the one or more first devices are an access network device related to the area in which the to-be-paged terminal device is located and that is in the first list.

For example, as shown in FIG. 3, if TAs corresponding to the to-be-paged terminal device are a TA list 2, that is, the TAs corresponding to the to-be-paged terminal device are a TA 4, a TA 5, a TA 6, a TA 7, a TA 8, and a TA 9, and the TA 4, the TA 5, the TA 6, the TA 7, the TA 8, and the TA 9 are all in a coverage area of an access network device A, the access network device A is the first device. In this case, there is one first device. For another example, as shown in FIG. 3, if TAs corresponding to the to-be-paged terminal device are a TA list 1, that is, the TAs of the to-be-paged terminal device are a TA 1, a TA 2, a TA 3, a TA 4, a TA 5, and a TA 6, the TA 1 and the TA 2 are in a coverage area of an access network device 1, the TA 3, the TA 4, and the TA 5 are in a coverage area of an access network device 2, and the TA 6 is in a coverage area of an access network device 3, the access network device 1, the access network device 2, and the access network device 3 are all the first devices. In this case, there are three first devices.

When there are a plurality of first devices, each first device performs each process included in the method 200.

Process 220: The first device determines a first cell, where an area identifier of the first cell at a first moment is different from an area identifier of the first cell at a second moment, the first moment is a current moment, and the second moment is earlier than the first moment.

The area identifier of the first cell is a TAC. Alternatively, the area identifier of the first cell is a RANAC and/or a cell global identifier.

When the first list is the TAI list, the area identifier of the first cell is the TAC. When the first list is the list including the RNA and/or the cell global identifier, the area identifier of the first cell is the RANAC and/or the cell global identifier.

That an area identifier of the first cell at a first moment is different from an area identifier of the first cell at a second moment may be understood as: The area identifier of the first cell changes within a first time period, where the first time period is a time period between the first moment and the second moment.

The first cell may be one or more cells that are covered by the first device and whose area identifiers at the first moment and the second moment are different. For example, cells covered by the first device are a cell 1, a cell 2, and a cell 3. At the second moment, a TAC corresponding to the cell 1 is a TAC 1, a TAC corresponding to the cell 2 is a TAC 2, and a TAC corresponding to the cell 3 is a TAC 3. At the first moment, a TAC corresponding to the cell 1 is the TAC 1, a TAC corresponding to the cell 2 is the TAC 2, and a TAC corresponding to the cell 3 is a TAC 4. In this case, the TAC corresponding to the cell 3 at the first moment is different from the TAC corresponding to the cell 3 at the second moment, in other words, the TAC of the cell 3 changes within the time period between the first moment and the second moment. Therefore, at the first moment, the cell 3 is the first cell, in other words, there is one first cell. For another example, cells covered by the first device are a cell a, a cell b, and a cell c. At the second moment, a TAC corresponding to the cell a is a TAC a, a TAC corresponding to the cell b is a TAC b, and a TAC corresponding to the cell c is a TAC c. At the first moment, a TAC corresponding to the cell a is the TAC a, a TAC corresponding to the cell b is the TAC c, and a TAC corresponding to the cell c is a TAC d. In this case, the TAC corresponding to the cell b at the first moment is different from the TAC corresponding to the cell b at the second moment, and the TAC corresponding to the cell c at the first moment is different from the TAC corresponding to the cell c at the second moment. In other words, the TAC of the cell b changes in the time period between the first moment and the second moment, and the TAC of the cell c changes in the time period between the first moment and the second moment. Therefore, at the first moment, both the cell b and the cell c are the first cells, in other words, there are two first cells.

The cell covered by the first device may be understood as: The first device can provide a communication service for a terminal device in the cell covered by the first device. For example, the cells covered by the first device are the cell 1, the cell 2, and the cell 3, terminal devices in the cell 1 include a terminal device 1 and a terminal device 2, a terminal device in the cell 2 includes a terminal device 3, and terminal devices in the cell 3 include a terminal device 4, a terminal device 5, and a terminal device 6. That the first device can provide a communication service for a terminal device in the cell covered by the first device means: The first device can provide the communication service for the terminal device 1 and the terminal device 2 in the cell 1, can provide the communication service for the terminal device 3 in the cell 2, and can further provide the communication service for the terminal device 4 and the terminal device 5 in the cell 3.

Process 230: When the area identifier of the first cell at the first moment does not belong to the first list, the first device stops paging a terminal device in the first cell.

When the area identifier of the first cell does not belong to the first list, that the first device stops paging a terminal device in the first cell means: The first device stops sending the first paging message to the terminal device in the first cell through the first cell.

In one embodiment, when the area identifier of the first cell changes, the first device determines whether the identifier of the first cell at the first moment belongs to the first list. When the area identifier of the first cell at the first moment does not belong to the first list, the first device stops paging the terminal device in the first cell. When the area identifier of the first cell at the first moment belongs to the first list, the first device pages the terminal device in the first cell. When the area identifier of the first cell belongs to the first list, that the first device pages the terminal device in the first cell means: The first device sends the first paging message to the terminal device in the first cell through the first cell.

For example, as shown in FIG. 3, if the TAs of the to-be-paged terminal device are the TA list 2, that is, the TAs of the to-be-paged terminal device are the TA 4, the TA 5, the TA 6, the TA 7, the TA 8, and the TA 9, and the TA 4, the TA 5, the TA 6, the TA 7, the TA 8, and the TA 9 are all in the coverage area of the device A, and if a TA corresponding to the TAC of the first cell of the first device is the TA 3, the identifier of the first cell does not belong to the first list, and the first device stops sending the first paging message through the first cell; or if a TA corresponding to the TAC of the first cell of the first device is the TA 8, the identifier of the first cell belongs to the first list, and the first device sends the first paging message to the terminal device in the first cell through the first cell.

When the first core network device initiates the paging (the to-be-paged terminal device is in the RRC idle state), the first core network device sends the first paging message to the first device. The first device determines whether the TAC of the cell covered by the first device, namely, the first cell, belongs to the TAI list of the to-be-paged terminal device. When the TAC of the first cell belongs to the first list, the first device sends the first paging message to the terminal device in the first cell through the first cell. When the TAC of the first cell does not belong to the first list, the first device stops sending the first paging message through the first cell. In this way, signaling overheads of the first device can be reduced, and power of the first device can be saved.

When the fourth device (the fourth device is the access network device that last serves the terminal device before the terminal device enters the RRC third state from the RRC connected state) initiates the paging, the fourth device sends the first paging message to the first device. The first device determines whether the RANAC of the cell covered by the first device, namely, the first cell, belongs to the RNA list of the to-be-paged terminal device. When the RANAC of the first cell belongs to the first list, the first device sends the first paging message to the terminal device in the first cell through the first cell. When the RANAC of the first cell does not belong to the first list, the first device stops sending the first paging message through the first cell. In this way, signaling overheads of the first device can be reduced.

Figure 8:
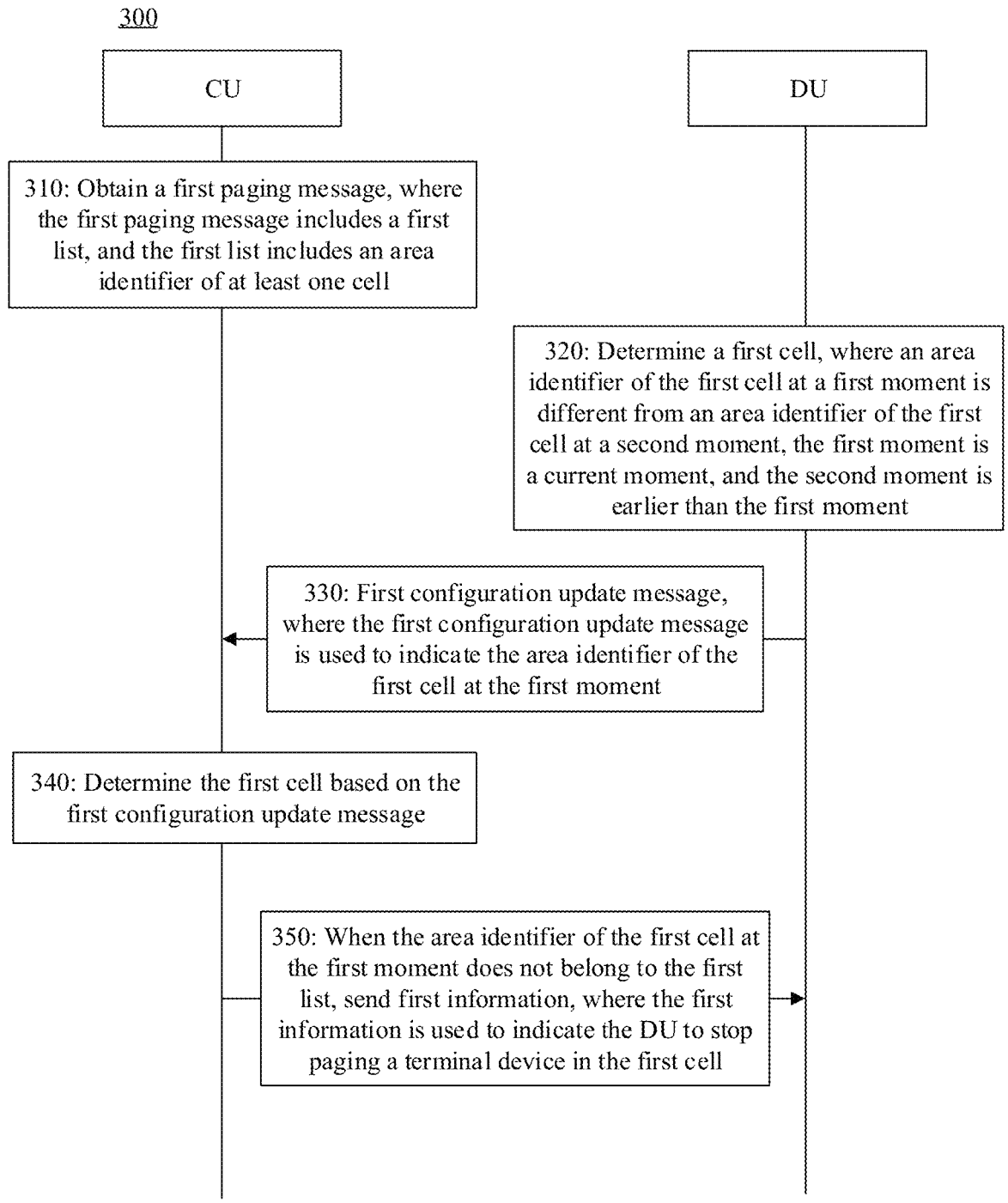
FIG. 8 is a schematic flowchart of another paging method 300 according to an embodiment of this application.

FIG. 8 is a schematic flowchart of a paging method 300 according to this application. With reference to FIG. 8, the following describes the paging method 300 provided in an embodiment of this application. The method 300 includes process 310 to process 350. A DU in the method 300 may be the DU carried by the satellite in FIG. 6, and a CU is the CU disposed on the ground in FIG. 6.

Process 310: The CU obtains a first paging message, where the first paging message includes a first list, and the first list includes an area identifier of at least one cell.

The first paging message may further include an identifier of a to-be-paged terminal device.

The at least one cell is a cell in which the to-be-paged terminal device may be located. That the at least one cell is a cell in which the to-be-paged terminal device may be located may be understood as: The to-be-paged terminal device is in an area covered by the at least one cell.

The first list is a TAI list, or is an RNA list.

When the first list is the TAI list, the CU receives the first paging message sent by a first core network device. In this case, the terminal device is in an RRC idle state and a CM idle state, and the core network device knows a TA in which the to-be-paged terminal device is located. Therefore, paging of the terminal device is initiated by the core network device. This paging mode is CN paging.

When the first list is the list including the RNA and/or the cell global identifier, the CU receives the first paging message sent by a fourth device. In this case, the terminal device is in an RRC third state and a CM_CONNECTED state. The fourth device is an access network device that last serves the terminal device before the terminal device enters the RRC third state from an RRC connected state, and the access network device that last serves the to-be-paged terminal device before the to-be-paged terminal device enters the RRC third state from the RRC connected state knows an RNA and/or the cell in which the to-be-paged terminal device is located. Therefore, paging of the terminal device is initiated by the access network device that last serves the terminal device before the terminal device enters the RRC third state from the RRC connected state. This paging mode is RAN paging.

In one embodiment, there may be one or more CUs, and the one or more CUs are an access network device related to the TA in which the to-be-paged terminal device is located and that is in the first list.

When there are a plurality of CUs, each CU performs each process included in the method 300.

In one embodiment, the first paging message may further include an identity of a terminal device, and the identity of the terminal device is an identity of the to-be-paged terminal device.

In one embodiment, after obtaining the first paging message, the CU determines, based on the first paging message, that the TA in which the to-be-paged terminal device is located and that is included in the first list in the first paging message is in a cell covered by the DU, and further sends the first paging message to the corresponding DU. The corresponding DU regenerates a second paging message, and sends the second paging message to a corresponding cell of the DU, where the second paging message includes a list of cells that is related to the DU and the identifier of the to-be-paged terminal device. For example, TAs of the to-be-paged terminal device in the first paging message include a TA 1, a TA 2, a TA 3, a TA 4, a TA 5, and a TA 6, where the TA 1 and the TA 2 are in a cell 1, the TA 3 is in a cell 2, and the TA 4, the TA 5, and the TA 6 are in a cell 3. In this case, DUs connected to the CU include a device 1, a device 2, a device 3, and a device 4, where the device 1 covers the cell 1 and the cell 2, and the device 3 covers the cell 3. In this case, the CU sends a list 1 of cells to the device 1, where the list 1 of cells includes the cell 1 and the cell 2; the CU further sends a list 2 of cells to the device 3, where the list 2 of cells includes the cell 3. In this case, after receiving the list 1 of cells, the device 1 generates a second paging message, and sends the second paging message to each cell in the list 1 of cells based on the list 1 of cells. In addition, after receiving the list 2 of cells, the device 3 generates a second paging message, and sends the second paging message to each cell in the list 2 of cells based on the list 2 of cells. The second paging message includes the identifier of the to-be-paged terminal device.

Process 320: The DU determines a first cell, where an area identifier of the first cell at a first moment is different from an area identifier of the first cell at a second moment, the first moment is a current moment, and the second moment is earlier than the first moment.

That an area identifier of the first cell at a first moment is different from an area identifier of the first cell at a second moment may be understood as: The area identifier of the first cell changes within a first time period, where the first time period is a time period between the first moment and the second moment.

The area identifier of the first cell is a TAC. Alternatively, the area identifier of the first cell is a RANAC and/or a cell global identifier.

In one embodiment, when the first list is the TAI list, the area identifier of the first cell is the TAC. Alternatively, when the first list is the list including the RNA and/or the cell global identifier, the area identifier of the first cell is the RANAC and/or the cell global identifier.

The first cell is one or more cells that are covered by the DU and whose area identifiers at the first moment and the second moment are different.

The cell covered by the DU may be understood as: The DU can provide a communication service for a terminal device in the cell covered by the DU.

For example, a cell covered by the DU at a moment $t_0$ is a cell 1, and a TAC corresponding to the cell 1 is a TAC 1. An area covered by the DU on the ground continuously changes with the moment. A cell covered by the DU at a moment $t_1$ is the cell 1, where $t_0$ is earlier than $t_1$, and a TAC corresponding to the cell 1 is a TAC 2. In this case, the DU may determine that the cell 1 is the first cell.

For another example, a cell covered by the DU at a moment $t_0$ is a cell 2, and a RANAC corresponding to the cell 2 is a RANAC 1. An area covered by the DU on the ground continuously changes with the moment. A cell covered by the DU at a moment $t_1$ is the cell 2, where $t_0$ is earlier than $t_1$, and a RANAC corresponding to the cell 2 is a RANAC 2. In this case, the DU may determine that the cell 2 is the first cell.

There may be one or more DUs, and the one or more DUs are connected to the CU.

The first cell may be one or more cells that are in cells covered by the DU and whose identifiers at the first moment and the second moment are different.

Process 330: The CU receives a first configuration update message sent by the DU, where the first configuration update message is used to indicate the area identifier of the first cell at the first moment. Correspondingly, the DU sends the first configuration update message to the CU.

In one embodiment, when an area identifier of the cell covered by the DU changes, the DU sends the first configuration update message to the CU, where the first configuration update message includes the area identifier that changes and that is of the cell covered by the DU. The first configuration update message may be a DU configuration update message.

In one embodiment, when there are a plurality of first cells, the DU may send a plurality of DU configuration update messages to the CU, and each of the plurality of DU configuration update messages is used to indicate an area identifier of the cell 3 at a moment $t_3$. $t_3$ is any moment, and area identifiers of the cell 3 covered by the DU that are in the first time period including the moment $t_3$ are different.

Process 340: The CU determines the first cell based on the first configuration update message.

It may be understood that the CU may determine, based on the first configuration update message, a cell that is in the cells covered by the DU and whose area identifier changes.

Process 350: When the identifier of the first cell at the first moment does not belong to the first list, the CU sends first information to the DU, where the first information is used to indicate the DU to stop paging a terminal device in the first cell.

In one embodiment, when the area identifier of the first cell changes, the CU determines whether the area identifier of the first cell at the first moment belongs to the first list. When the identifier of the first cell at the first moment does not belong to the first list, the CU forbids paging of the terminal device in the first cell. When the area identifier of the first cell at the first moment belongs to the first list, the CU pages the terminal device in the first cell.

When the area identifier of the first cell at the first moment belongs to the first list, that the CU pages the terminal device in the first cell may be understood as: The CU sends the first paging message to the DU, and the DU regenerates the second paging message, and sends the second paging message to the terminal device in the first cell through the first cell, where the second paging message includes the identifier of the first cell and the identifier of the to-be-paged terminal device, so that the DU pages the to-be-paged terminal device through the first cell.

When the area identifier of the first cell at the first moment does not belong to the first list, that the CU stops paging the terminal device in the first cell may be understood as: The CU does not send the first paging message to the DU. In this case, the CU sends the first information to the DU. When receiving the first information, the DU stops sending the second paging message to the terminal device in the first cell.

The first information is carried in radio resource control (RRC) signaling, or the first information is carried in a first configuration update acknowledgment (ACK) message.

When the first core network device initiates the paging, the first core network device sends the first paging message to the CU. The CU receives the first configuration update message sent by the DU, and determines whether the TAC of the cell covered by the DU, namely, the first cell, belongs to the TAI list of the to-be-paged terminal device. When the TAC of the first cell belongs to the first list, the CU sends the first paging message to the DU, and the DU regenerates the second paging message, and sends the second paging message to the terminal device in the first cell through the first cell. When the TAC of the first cell does not belong to the first list, the CU sends the first information to the DU, where the first information is used to indicate the DU to stop paging the terminal device in the first cell, that is, the DU does not send the second paging message to the terminal device in the first cell. In this way, signaling overheads of the CU can be reduced, and power of the CU can be saved.

When the fourth device (the fourth device is the access network device that last serves the terminal device before the terminal device enters the RRC third state from the RRC connected state) initiates the paging, the fourth device sends the first paging message to the CU. The CU receives the first configuration update message sent by the DU, and determines whether the RANAC of the cell covered by the DU, namely, the first cell, belongs to the RNA list of the to-be-paged terminal device. When the RANAC of the first cell belongs to the first list, the CU sends the first paging message to the DU, and the DU regenerates the second paging message, and sends the second paging message to the terminal device in the first cell through the first cell. When the RANAC of the first cell does not belong to the first list, the CU sends the first information to the DU, where the first information is used to indicate the DU to stop paging the terminal device in the first cell, that is, the DU does not send the second paging message to the terminal device in the first cell. In this way, signaling overheads of the CU can be reduced, and power of the CU can be saved.

Figure 9:
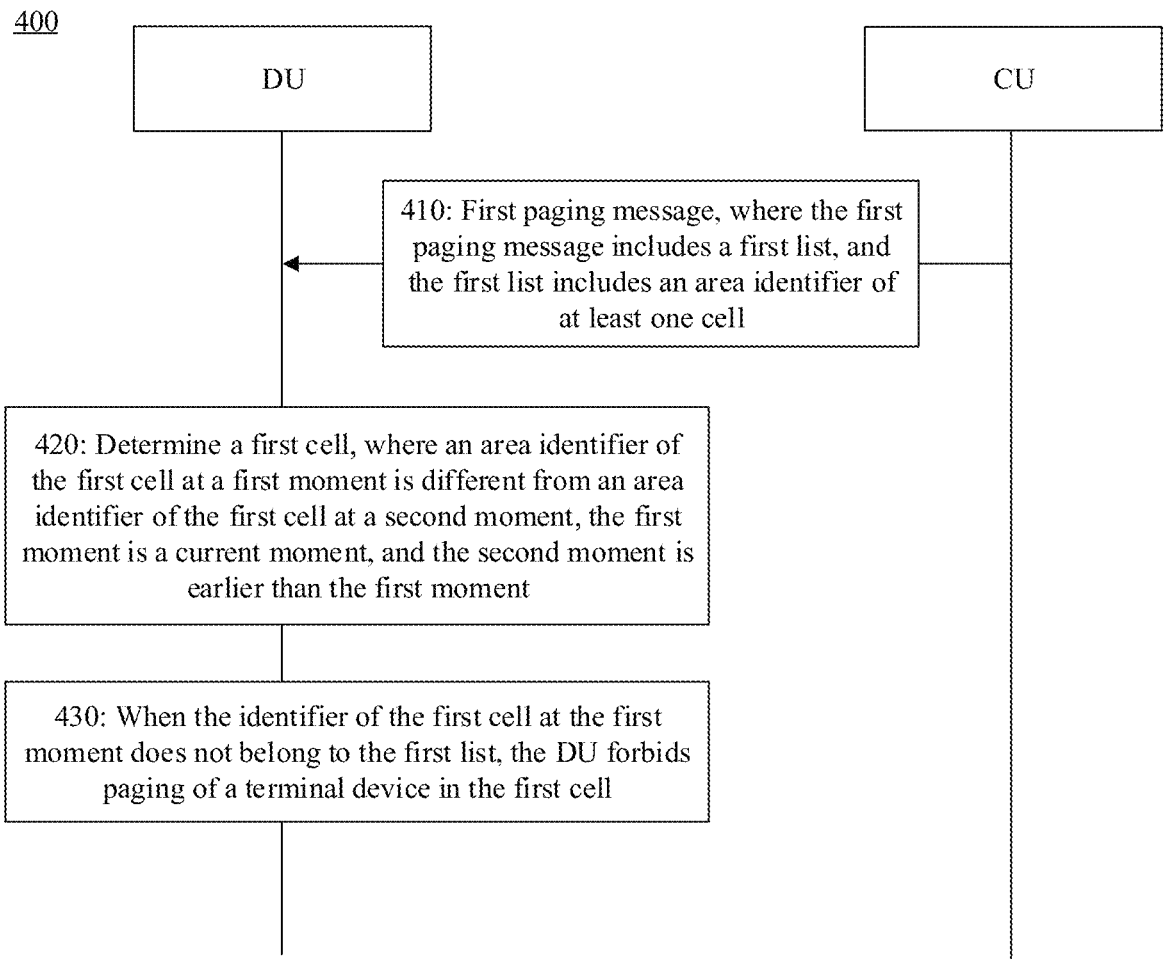
FIG. 9 is a schematic flowchart of still another paging method 400 according to an embodiment of this application.

FIG. 9 is a schematic flowchart of a paging method 400 according to this application. With reference to FIG. 9, the following describes the paging method 400 provided in an embodiment of this application. The method 400 includes process 410 to process 430. A DU in the method 400 may be the DU carried by the satellite in FIG. 6, and a CU is the CU disposed on the ground in FIG. 6.

Process 410: The DU receives a first paging message sent by the CU, where the first paging message includes a first list, and the first list includes an area identifier of at least one cell. Correspondingly, the CU sends the first paging message to the DU.

The first paging message further includes an identity of a terminal device, and the identity of the terminal device is an identity of a to-be-paged terminal device.

The at least one cell is a cell in which the to-be-paged terminal device may be located. That the at least one cell is a cell in which the to-be-paged terminal device may be located may be understood as: The to-be-paged terminal device is in an area covered by the at least one cell.

The first list is a TAI list, and an area identifier of a first cell is a TAC. Alternatively, the first list is an RNA list, and an area identifier of a first cell is a RANAC and/or a cell global identifier.

When the first list is the TAI list, the CU receives the first paging message sent by a first core network device, and then sends the first paging message to the DU. In this case, the terminal device is in an RRC idle state and a CM idle state, and the core network device knows a TA in which the to-be-paged terminal device is located. Therefore, paging of the terminal device is initiated by the core network device. This paging mode is CN paging.

When the first list is the list including the RNA and/or the cell global identifier, the CU receives the first paging message sent by a fourth device, and then sends the first paging message to the DU. In this case, the terminal device is in an RRC third state and a CM_CONNECTED state. The fourth device is an access network device that last serves the terminal device before the terminal device enters the RRC third state from an RRC connected state, and the access network device that last serves the to-be-paged terminal device before the to-be-paged terminal device enters the RRC third state from the RRC connected state knows an RNA and/or the cell in which the to-be-paged terminal device is located. Therefore, paging of the terminal device is initiated by the access network device that last serves the terminal device before the terminal device enters the RRC third state from the RRC connected state. This paging mode is RAN paging.

In one embodiment, there may be one or more DUs, and the one or more DUs are an access network device related to the area in which the to-be-paged terminal device is located and that is in the first list.

When there are a plurality of DUs, each DU performs each process included in the method 200.

Process 420: The DU determines the first cell, where an area identifier of the first cell at a first moment is different from an area identifier of the first cell at a second moment, the first moment is a current moment, and the second moment is earlier than the first moment.

That an area identifier of the first cell at a first moment is different from an area identifier of the first cell at a second moment may be understood as: The area identifier of the first cell changes within a first time period, where the first time period is a time period between the first moment and the second moment.

The first cell may be one or more cells that are covered by the DU and whose area identifiers at the first moment and the second moment are different.

The cell covered by the DU may be understood as: The DU can provide a communication service for a terminal device in the cell covered by the DU.

When the first list is the TAI list, the area identifier of the first cell is the TAC. When the first list is the list including the RNA and/or the cell global identifier, the area identifier of the first cell is the RANAC and/or the cell global identifier.

Process 430: When the area identifier of the first cell does not belong to the first list, the DU stops paging a terminal device in the first cell.

In one embodiment, when the area identifier of the first cell changes, the DU determines whether the area identifier of the first cell belongs to the first list. When the area identifier of the first cell does not belong to the first list, the DU stops paging the terminal device in the first cell. When the area identifier of the first cell belongs to the first list, the DU pages the terminal device in the first cell.

That the DU stops paging the terminal device in the first cell may be understood as: The DU does not send the first paging message to the terminal device in the first cell. That the DU pages the terminal device in the first cell may be understood as: The DU sends the first paging message to the terminal device in the first cell.

When the first core network device initiates the paging (the to-be-paged terminal device is in the RRC idle state), the first core network device sends the first paging message to the CU, and the CU sends the first paging message to the DU. The DU determines whether the TAC of the cell covered by the DU, namely, the first cell, belongs to the TAI list of the to-be-paged terminal device. When the TAC of the first cell belongs to the first list, the DU sends the first paging message to the terminal device in the first cell. When the TAC of the first cell does not belong to the first list, the DU stops sending the first paging message. In this way, signaling overheads of the DU can be reduced, and power of the DU can be saved.

When the fourth device (the fourth device is the access network device that last serves the terminal device before the terminal device enters the RRC third state from the RRC connected state) initiates the paging, the fourth device sends the first paging message to the CU, and the CU sends the first paging message to the DU. The DU determines whether the RANAC of the cell covered by the DU, namely, the first cell, belongs to the RNA list of the to-be-paged terminal device. When the RANAC of the first cell belongs to the first list, the DU sends the first paging message to the terminal device in the first cell. When the RANAC of the first cell does not belong to the first list, the DU stops sending the first paging message. In this way, signaling overheads of the DU can be reduced, and power of the DU can be saved.

The foregoing describes in detail the paging method in embodiments of this application with reference to FIG. 1 to FIG. 9. The following describes in detail an apparatus in embodiments of this application with reference to FIG. 10 to FIG. 14. It should be understood that apparatuses shown in FIG. 10 to FIG. 14 can implement one or more processes in the method procedures shown in FIG. 7 to FIG. 9. To avoid repetition, details are not described herein again.

Figure 10:
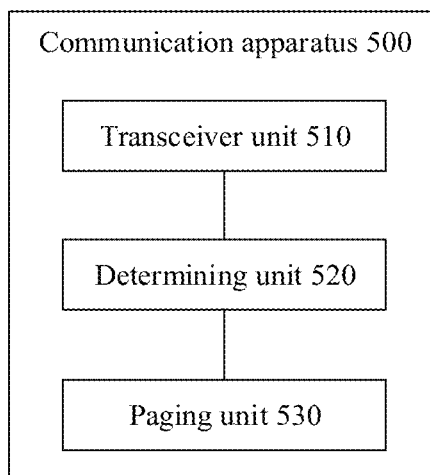
FIG. 10 is a schematic diagram of a paging apparatus 500 according to this application.

FIG. 10 is a schematic diagram of a paging apparatus 500 according to this application. The paging apparatus 500 includes a receiving unit 510, a determining unit 520, and a paging unit 530. The apparatus 500 is configured to perform procedures and processes corresponding to the first device in the foregoing method 200.

The receiving unit 510 is configured to receive a first paging message, where the first paging message includes a first list, and the first list includes an area identifier of at least one cell.

The determining unit 520 is configured to determine a first cell, where an area identifier of the first cell at a first moment is different from an area identifier of the first cell at a second moment, the first moment is a current moment, and the second moment is earlier than the first moment.

The paging unit 530 is configured to: when the area identifier of the first cell at the first moment does not belong to the first list, stop paging a terminal device in the first cell.

In one embodiment, the first list is a TAI list, and the area identifier of the first cell is a TAC. Alternatively, the first list is a list including an RNA and/or a cell global identifier, and the area identifier of the first cell is a RANAC and/or a cell global identifier.

In one embodiment, the paging unit 530 is further configured to: when the area identifier of the first cell at the first moment belongs to the first list, page the terminal device in the first cell.

In one embodiment, the paging apparatus 500 may be an access network device, for example, the following base station 80. A function of the determining unit 520 and a function of the paging unit 530 may be implemented by a processor 8022 in the base station, and a function of the receiving unit 510 may be implemented by an RRU 801 in the base station 80.

Figure 11:
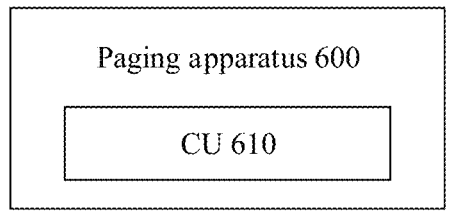
FIG. 11 is a schematic diagram of a paging apparatus 600 according to this application.

FIG. 11 is a schematic diagram of a paging apparatus 600 according to this application. The paging apparatus 600 includes a CU 610. The apparatus 600 may be a first apparatus, or may be a chip in the first apparatus.

In one embodiment, in which the apparatus 600 is the first apparatus, the apparatus 600 is configured to perform procedures and processes corresponding to the CU in the foregoing method 300.

The centralized unit CU 610 is configured to receive a first paging message, where the first paging message includes a first list, and the first list includes an area identifier of at least one cell.

The CU 610 is further configured to receive a first configuration update message sent by a second apparatus, where the first configuration update message is used to indicate an area identifier of a first cell at a first moment, and the second apparatus includes a distributed unit (DU).

The CU 610 is further configured to determine the first cell based on the first configuration update message.

When the area identifier of the first cell at the first moment does not belong to the first list, the CU is further configured to send first information to the second apparatus, where the first information is used to indicate the second apparatus to stop paging a terminal device in the first cell.

In one embodiment, the first list is a TAI list, and the area identifier of the first cell is a TAC. Alternatively, the first list is a list including an RNA and/or a cell global identifier, and the area identifier of the first cell is a RANAC and/or a cell global identifier.

In one embodiment, the first information is carried in radio resource control (RRC) signaling, or the first information is carried in a first configuration update acknowledgment (ACK) message.

In one embodiment, in which the apparatus 600 may be the first apparatus, the apparatus 600 is configured to perform procedures and processes corresponding to the CU in the foregoing method 400.

The CU 610 is configured to receive a first paging message, where the first paging message includes a first list, and the first list includes an area identifier of at least one cell.

The CU 610 is configured to send the first paging message to a second apparatus, where the second apparatus includes a distributed unit (DU)e.

In one embodiment, the first list is a TAI list, and an area identifier of a first cell is a TAC. Alternatively, the first list is a list including an RNA and/or a cell global identifier, and an area identifier of a first cell is a RANAC and/or a cell global identifier.

In one embodiment, the paging apparatus 600 may be an access network device, for example, the following base station 80, and a function of the CU 510 may be implemented by a processor 8022 in the base station.

Figure 12:
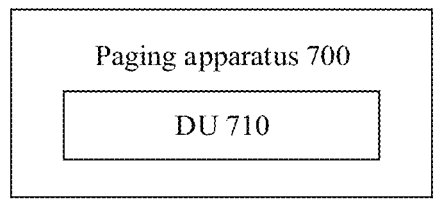
FIG. 12 is a schematic diagram of a paging apparatus 700 according to this application.

FIG. 12 is a schematic diagram of a paging apparatus 700 according to this application. The second apparatus 700 includes a DU 710. The apparatus 700 may be a second apparatus, or may be a chip in the second apparatus.

In one embodiment, in which the apparatus 700 is the second apparatus, the apparatus 700 is configured to perform procedures and processes corresponding to the DU in the foregoing method 300.

The DU 710 is configured to determine a first cell, where an area identifier of the first cell at a first moment is different from an area identifier of the first cell at a second moment, the first moment is a current moment, and the second moment is earlier than the first moment.

The DU 710 is further configured to send a first configuration update message to a first apparatus, where the first configuration update message is used to indicate the area identifier of the first cell at the first moment, and the first apparatus includes a centralized unit CU.

The DU 710 is further configured to receive first information sent by the first apparatus, where the first information is used to indicate the DU to stop paging a terminal device in the first cell.

In one embodiment, the first information is carried in radio resource control (RRC) signaling, or the first information is carried in a first configuration update acknowledgment (ACK) message.

In one embodiment, in which the apparatus 700 is the second apparatus, the apparatus 700 is configured to perform procedures and processes corresponding to the DU in the foregoing method 400.

The DU 710 is configured to receive a first paging message sent by a first apparatus, where the first paging message includes a first list, the first list includes an area identifier of at least one cell, and the first apparatus includes a centralized unit (CU).

The DU 710 is further configured to determine a first cell, where an area identifier of the first cell at a first moment is different from an area identifier of the first cell at a second moment, the first moment is a current moment, and the second moment is earlier than the first moment. When the area identifier of the first cell at the first moment does not belong to the first list, the DU 710 is further configured to stop paging a terminal device in the first cell.

In one embodiment, the first list is a TAI list, and the area identifier of the first cell is a TAC. Alternatively, the first list is a list including an RNA and/or a cell global identifier, and the area identifier of the first cell is a RANAC and/or a cell global identifier.

In one embodiment, the DU 710 is further configured to: when the area identifier of the first cell at the first moment belongs to the first list, page the terminal device in the first cell.

In one embodiment, the paging apparatus 700 may be an access network device, for example, the following base station 80, and a function of the DU 710 may be implemented by a BBU 802 in the base station.

Figure 13:
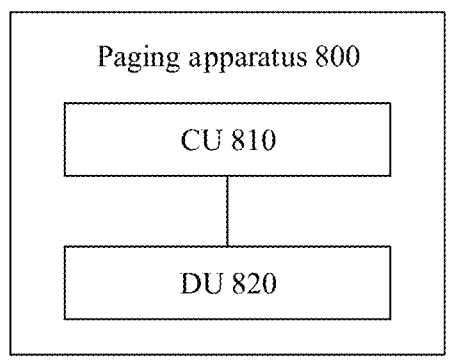
FIG. 13 is a schematic diagram of a paging apparatus 800 according to this application.

FIG. 13 is a schematic diagram of a paging apparatus 800 according to this application. The paging apparatus 800 includes a CU 810 and a DU 820.

In one embodiment, the DU 820 in the apparatus 800 is configured to perform procedures and processes corresponding to the DU in the foregoing method 300. The CU 810 in the apparatus 800 is configured to perform procedures and processes corresponding to the CU in the foregoing method 300.

The CU 810 is configured to receive a first paging message, where the first paging message includes a first list, and the first list includes an area identifier of at least one cell.

The DU 820 is configured to determine a first cell, where an area identifier of the first cell at a first moment is different from an area identifier of the first cell at a second moment, the first moment is a current moment, and the second moment is earlier than the first moment.

The CU 810 is configured to receive a first configuration update message sent by the DU 820, where the first configuration update message is used to indicate the area identifier of the first cell at the first moment.

The CU 810 is further configured to determine the first cell based on the first configuration update message.

When the area identifier of the first cell at the first moment does not belong to the first list, the CU 810 is further configured to send first information to the DU 820, where the first information is used to indicate the DU 820 to stop paging a terminal device in the first cell.

In one embodiment, the first list is a TAI list, and the area identifier of the first cell is a TAC. Alternatively, the first list is a list including an RNA and/or a cell global identifier, and the area identifier of the first cell is a RANAC and/or a cell global identifier.

In one embodiment, the first information is carried in radio resource control (RRC) signaling, or the first information is carried in a first configuration update acknowledgment (ACK) message.

In one embodiment, the DU 820 in the apparatus 800 is configured to perform procedures and processes corresponding to the DU in the foregoing method 400. The CU 810 in the apparatus 800 is configured to perform procedures and processes corresponding to the CU in the foregoing method 400.

The CU 810 is configured to receive a first paging message, where the first paging message includes a first list, and the first list includes an area identifier of at least one cell.

The DU 820 is configured to receive the first paging message sent by the CU 810.

The DU 820 is further configured to determine a first cell, where an area identifier of the first cell at a first moment is different from an area identifier of the first cell at a second moment, the first moment is a current moment, and the second moment is earlier than the first moment.

When the area identifier of the first cell at the first moment does not belong to the first list, the DU 820 is further configured to stop paging a terminal device in the first cell.

In one embodiment, the first list is a TAI list, and the area identifier of the first cell is a TAC. Alternatively, the first list is a list including an RNA and/or a cell global identifier, and the area identifier of the first cell is a RANAC and/or a cell global identifier.

In one embodiment, the DU 820 is further configured to: when the area identifier of the first cell at the first moment belongs to the first list, page the terminal device in the first cell.

In one embodiment, the paging apparatus 800 may be an access network device, for example, the following base station 80. A function of the DU 820 may be implemented by a BBU 802 in the base station, and a function of the CU 810 may be implemented by an RRU 801 in the base station.

Figure 14:
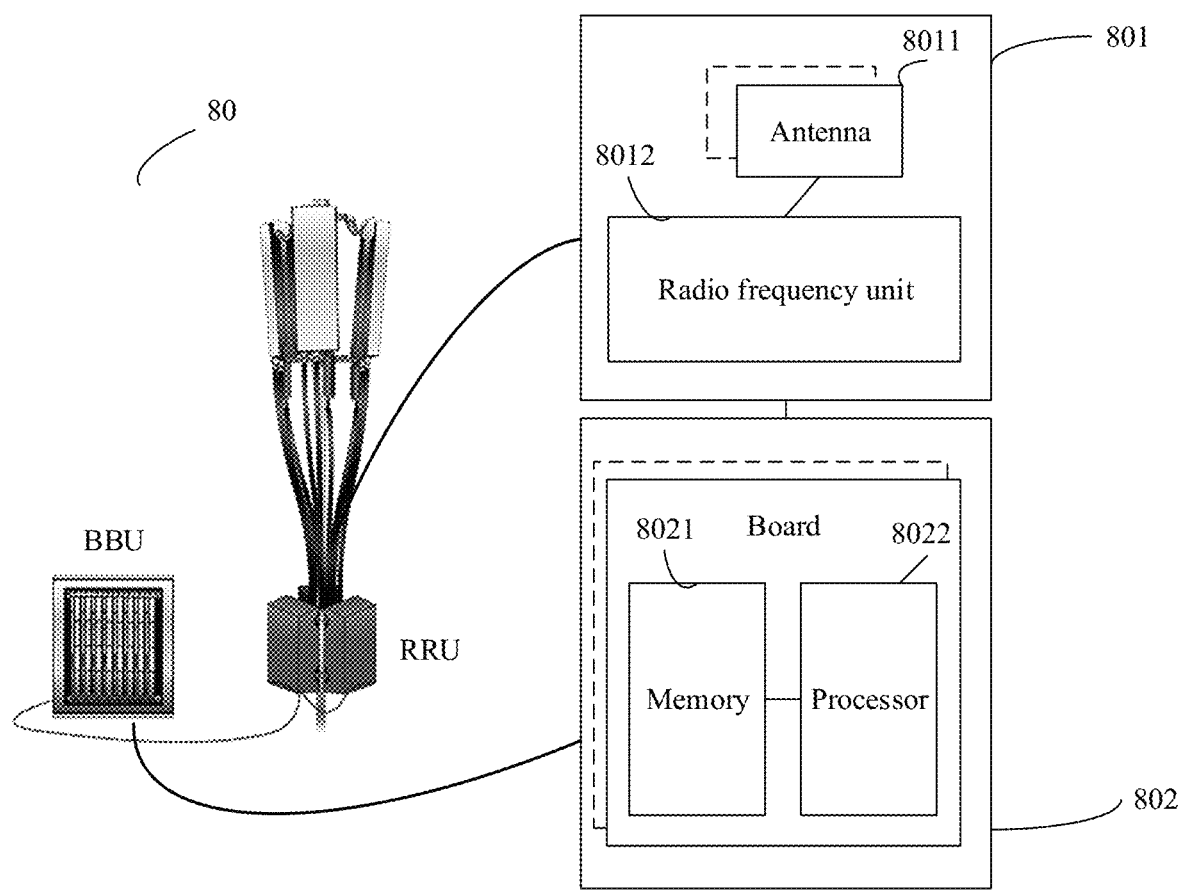
FIG. 14 is a schematic diagram of a structure of an access network device according to this application.

The following describes a structure of the access network device in embodiments of this application with reference to FIG. 14.

FIG. 14 is a schematic diagram of a structure of an access network device according to an embodiment of this application, for example, may be a schematic diagram of a structure of a base station. As shown in FIG. 14, the base station may be used in the system shown in FIG. 1, to perform functions of the access network device in the foregoing method embodiments. The base station 80 may include one or more radio frequency units such as a remote radio unit (RRU) 801 and one or more baseband units (BBU) (which may also be referred to as digital units (DU)) 802. The RRU 801 may be referred to as a transceiver unit, a transceiver machine, a transceiver circuit, a transceiver, or the like, and may include at least one antenna 8011 and a radio frequency unit 8012. The RRU 801 is mainly configured to send and receive a radio frequency signal and perform conversion between the radio frequency signal and a baseband signal. The BBU 802 is mainly configured to: perform baseband processing, control the base station, and so on. The RRU 801 and the BBU 802 may be physically disposed together, or may be physically separated, that is, in a distributed base station.

The BBU 802, also referred to as a processing unit, is a control center of the base station, and is mainly configured to complete baseband processing functions such as channel coding, multiplexing, modulation, and spectrum spreading. For example, the BBU (the processing unit) 802 may be configured to control the base station to perform operation procedures related to the access network device in the foregoing method embodiments.

In an example, the BBU 802 may include one or more boards. A plurality of boards may jointly support a radio access network (for example, an LTE network) of a single access standard, or may respectively support radio access networks (for example, an LTE network, a 5G network, or another network) of different access standards. The BBU 802 further includes a memory 8021 and a processor 8022. The memory 8021 is configured to store instructions and data. For example, the memory 8021 stores a correspondence between a codebook index and a precoding matrix in the foregoing embodiments. The processor 8022 is configured to control the base station to perform an action, for example, configured to control the base station to perform the operation procedure related to the access network device in the foregoing method embodiments. The memory 8021 and the processor 8022 may serve one or more boards. In other words, a memory and a processor may be disposed on each board. Alternatively, a plurality of boards may share a same memory and a same processor. In addition, a circuit may be further disposed on each board.

It should be understood that, the processor in embodiments of this application may be a central processing unit (CPU), or may be another general purpose processor, a digital signal processor (DSP), an application-specific integrated circuit (ASIC), a field programmable gate array (FPGA) or another programmable logic device, a discrete gate, a transistor logic device, a discrete hardware component, or the like. The general purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example rather than limitative description, many forms of random access memories (RAMs) may be used, for example, a static random access memory (static RAM, SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

According to the method provided in embodiments of this application, this application further provides a computer program product. The computer program product includes computer program code. When the computer program code is run on a computer, the computer is enabled to perform the method in any one of the embodiments shown in FIG. 7 to FIG. 9.

According to the method provided in embodiments of this application, this application further provides a computer-readable medium. The computer-readable medium stores program code. When the program code is run on a computer, the computer is enabled to perform the method in any one of the embodiments shown in FIG. 7 to FIG. 9.

According to the method provided in embodiments of this application, this application further provides a chip system, including: a processor, configured to invoke a computer program from a memory and run the computer program, so that a communication device on which the chip system is installed performs the method in any one of the embodiments shown in FIG. 7 to FIG. 9.

All or some of the foregoing embodiments may be implemented by software, hardware, firmware, or any combination thereof. When the software is used to implement embodiments, all or some of the foregoing embodiments may be implemented in a form of a computer program product. The computer program product includes one or more computer instructions or computer programs. When the computer instructions or the computer programs are loaded and executed on a computer, procedures or functions according to embodiments of this application are all or partially generated. The computer may be a general-purpose computer, a special-purpose computer, a computer network, or other programmable apparatuses. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

A person of ordinary skill in the art may be aware that, in combination with the examples described in embodiments disclosed in this specification, units and algorithm processes may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for detailed working processes of the foregoing systems, apparatuses, and units, refer to corresponding processes in the foregoing method embodiments. Details are not described herein again.

In several embodiments provided in this application, it should be understood that the disclosed system, apparatus, and method may be implemented in another manner. For example, the described apparatus embodiments are merely examples. For example, the division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or the units may be implemented in electrical, mechanical, or other forms.

The units described as separate parts may or may not be physically separate, and parts displayed as units may or may not be physical units, and in one embodiment, may be located in one position, or may be distributed on a plurality of network units. Some or all of the units may be selected based on an actual requirement to achieve the objectives of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, an access network device, or the like) to perform all or some of the processes of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing description is merely embodiments in this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A paging apparatus comprising:
a centralized unit (CU) configured to receive a first paging message, wherein the first paging message comprises a first list, the first list comprising an area identifier of at least one cell, wherein,
the CU is further configured to receive a first configuration update message sent by a second apparatus, wherein the first configuration update message is used to indicate an area identifier of a first cell at a first moment, and the second apparatus comprises a distributed unit (DU);
the CU is further configured to determine the first cell based on the first configuration update message; and
when, the area identifier of the first cell at the first moment does not belong to the first list, the CU is further configured to send first information to the second apparatus, wherein, the first information is used to indicate the second apparatus to stop paging a terminal device in the first cell.

2. The apparatus according to claim 1, wherein the first list is a tracking area identity (TAI) list, and the area identifier of the first cell is a tracking area code (TAC); or
the first list is a list comprising an access network area (RNA) and/or a cell global identifier, and the area identifier of the first cell is an access network area code (RANAC) and/or a cell global identifier.

3. The apparatus according to claim 1, wherein the first information is carried in radio resource control (RRC) signaling, or the first information is carried in a first configuration update acknowledgment (ACK) message.

4. A paging apparatus comprising a distributed unit (DU) and a centralized unit (CU), wherein,
the CU is configured to receive a first paging message, wherein the first paging message comprises a first list, the first list comprising an area identifier of at least one cell;
the DU is configured to determine a first cell, wherein an area identifier of the first cell at a first moment is different from an area identifier of the first cell at a second moment, the first moment is a current moment, and the second moment is earlier than the first moment;
the CU is configured to receive a first configuration update message sent by the DU, wherein the first configuration update message is used to indicate the area identifier of the first cell at the first moment;
the CU is further configured to determine the first cell based on the first configuration update message; and
when, the area identifier of the first cell at the first moment does not belong to the first list, the CU is further configured to send first information to the DU, wherein the first information is used to indicate the DU to stop paging a terminal device in the first cell.

5. The apparatus according to claim 4, wherein the first list is a tracking area identity (TAI) list, and the area identifier of the first cell is a tracking area code (TAC); or
the first list is a list comprising an access network area (RNA) and/or a cell global identifier, and the area identifier of the first cell is an access network area code (RANAC) and/or a cell global identifier.

6. The apparatus according to claim 4, wherein the first information is carried in radio resource control (RRC) signaling, or the first information is carried in a first configuration update acknowledgment (ACK) message.

7. A paging apparatus, comprising:
a distributed unit (DU) configured to determine a first cell, wherein an area identifier of the first cell at a first moment is different from an area identifier of the first cell at a second moment, the first moment is a current moment, and the second moment is earlier than the first moment, wherein
the DU is further configured to send a first configuration update message to a first apparatus, wherein the first configuration update message is used to indicate the area identifier of the first cell at the first moment, and the first apparatus comprises a centralized unit (CU); and
the DU is further configured to receive first information sent by the first apparatus, wherein the first information is used to indicate the DU to stop paging a terminal device in the first cell.

8. The apparatus according to claim 7, wherein the first information is carried in radio resource control (RRC) signaling, or the first information is carried in a first configuration update acknowledgment (ACK) message.

* * * * *